(12) United States Patent
Caperell

(10) Patent No.: US 10,405,153 B2
(45) Date of Patent: *Sep. 3, 2019

(54) ALERT SYSTEM CAPABLE OF INDICATING THE NATURE OF AN OBJECT, PERSON, OR PET

(71) Applicant: Kerry Caperell, Prospect, KY (US)

(72) Inventor: Kerry Caperell, Prospect, KY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/943,186

(22) Filed: Apr. 2, 2018

(65) Prior Publication Data

US 2018/0227727 A1 Aug. 9, 2018

Related U.S. Application Data

(63) Continuation of application No. 15/147,405, filed on May 5, 2016, now Pat. No. 9,942,725.

(60) Provisional application No. 62/159,138, filed on May 8, 2015.

(51) Int. Cl.
| | |
|---|---|
| *G08B 13/14* | (2006.01) |
| *H04W 4/44* | (2018.01) |
| *H04W 4/04* | (2009.01) |
| *G08B 21/02* | (2006.01) |
| *H04W 4/021* | (2018.01) |
| *H04W 4/40* | (2018.01) |
| *G08B 21/24* | (2006.01) |
| *G08B 25/00* | (2006.01) |

(52) U.S. Cl.
CPC .......... *H04W 4/44* (2018.02); *G08B 21/0261* (2013.01); *G08B 21/0275* (2013.01); *G08B 21/0288* (2013.01); *G08B 21/24* (2013.01); *H04W 4/021* (2013.01); *H04W 4/046* (2013.01); *H04W 4/40* (2018.02); *G08B 25/008* (2013.01)

(58) Field of Classification Search
CPC .. H04W 4/046; H04W 4/021; G08B 21/0261; G08B 21/0288
USPC ........................................................ 340/572.1
See application file for complete search history.

(56) References Cited

U.S. PATENT DOCUMENTS

| | | | |
|---|---|---|---|
| 8,423,000 B2 | 4/2013 | Dhuna | |
| 8,818,405 B2 | 8/2014 | Sheilendra | |
| 2008/0062120 A1 | 3/2008 | Wheeler et al. | |
| 2008/0266118 A1* | 10/2008 | Pierson | A61B 5/0205 340/573.6 |

(Continued)

FOREIGN PATENT DOCUMENTS

WO 2015004510 1/2015

OTHER PUBLICATIONS

The Pebblebee, "The Most Affordable iOS/Android Bluetooth Device by The PebbleBee," https://www.kickstarter.com/projects/192833321/pebblebee-the-most-versatile-ios-android-bluetooth, Jan. 25, 2014.

(Continued)

*Primary Examiner* — Tanmay K Shah
(74) *Attorney, Agent, or Firm* — Arash Behravesh; Mannava & Kang, P.C.

(57) ABSTRACT

An alert system having a first wireless tag; and a control device capable of being in communication with the first wireless tag, wherein when the control device receives a signal from the wireless tag it is an indication of no event, and when the control device does not receive a signal from the wireless tag it is an indication of an even, thus the control device sends a notification to the user.

18 Claims, 26 Drawing Sheets

(56) References Cited

U.S. PATENT DOCUMENTS

| | | |
|---|---|---|
| 2010/0152600 A1 | 6/2010 | Droitcour et al. |
| 2010/0217096 A1 | 8/2010 | Nanikashvili |
| 2011/0105169 A1 | 5/2011 | Prabhu |
| 2011/0309922 A1 | 12/2011 | Ghabra et al. |
| 2012/0322380 A1 | 12/2012 | Nannarone et al. |
| 2013/0109342 A1* | 5/2013 | Welch ............ B60N 2/002 455/404.2 |
| 2013/0135097 A1 | 5/2013 | Doezema |
| 2013/0260785 A1 | 10/2013 | Shakespeare et al. |
| 2014/0045480 A1 | 2/2014 | Hsieh et al. |
| 2014/0058680 A1 | 2/2014 | Geva et al. |
| 2014/0073262 A1 | 3/2014 | Gutierrez et al. |
| 2014/0240088 A1* | 8/2014 | Robinette ......... G08B 13/1427 340/5.61 |
| 2014/0282877 A1 | 9/2014 | Mahaffey et al. |
| 2014/0282967 A1 | 9/2014 | Maguire et al. |
| 2014/0335490 A1 | 11/2014 | Baarman et al. |

OTHER PUBLICATIONS

Keith Shaw, "Sync Smartband: Tracking your kids without a leash or ankle bracelet," http://www.networkworld.com/article/2459159/internet-of-things/sync-smartband-tracking-your-kids-without-a-leash-or-ankle-bracelet.html, Jul. 30, 2014.

Catherine Shu, "Guardian Uses Bluetooth Low Energy Tech to Keep Your Child Safe," http://techcrunch.com/2013/10/09/guardian-uses-bluetooth-low-energy-tech-to-keep-your-child-safe/, Oct. 9, 2013.

* cited by examiner

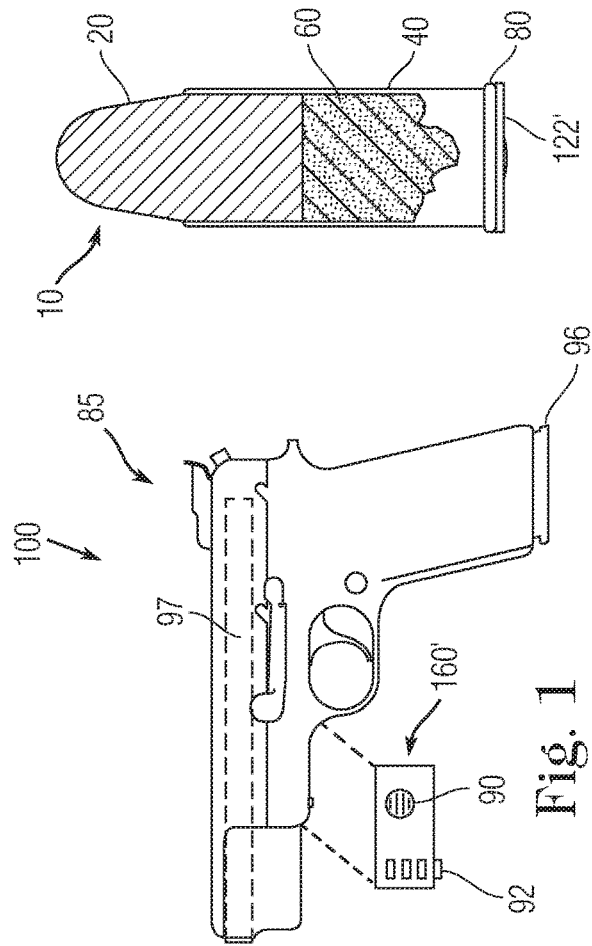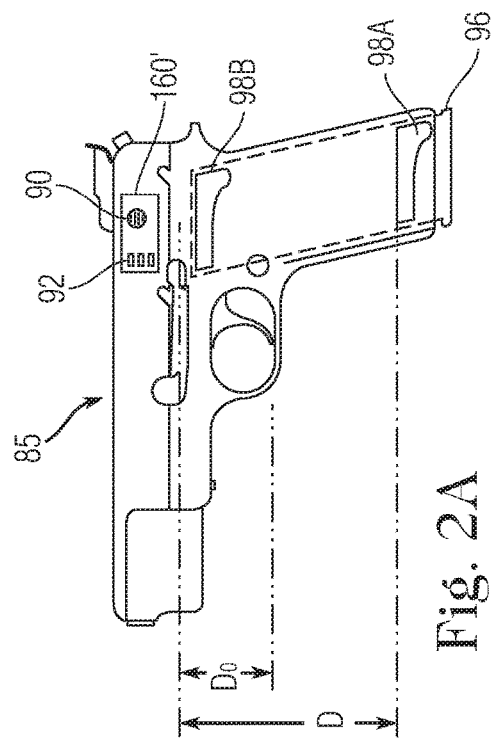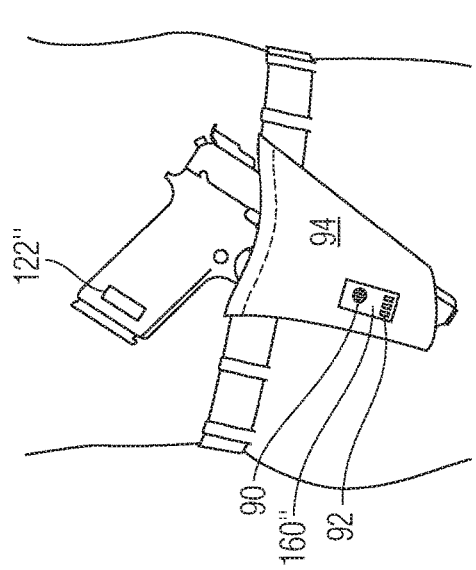

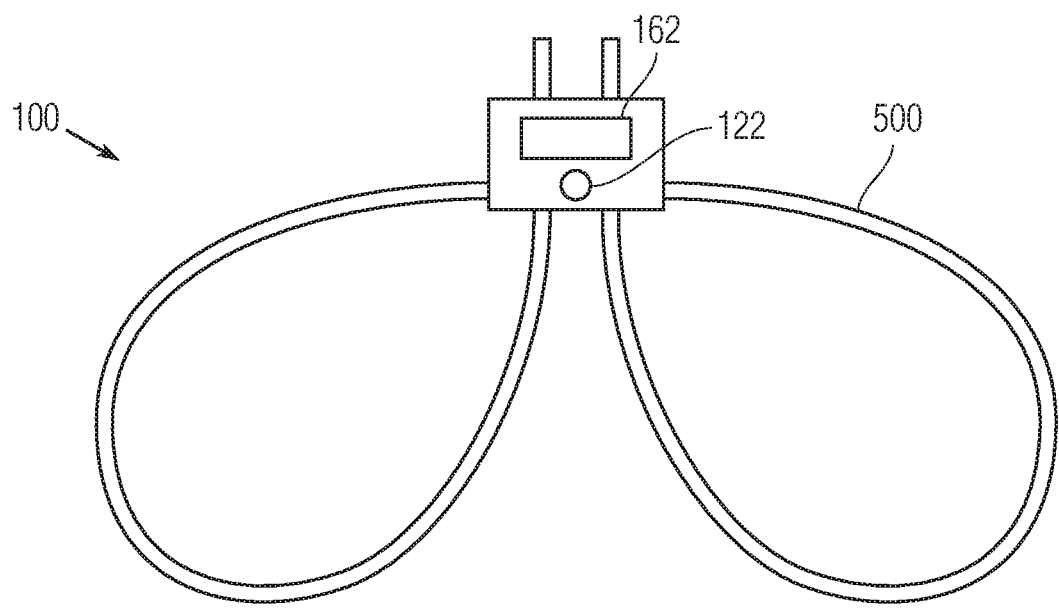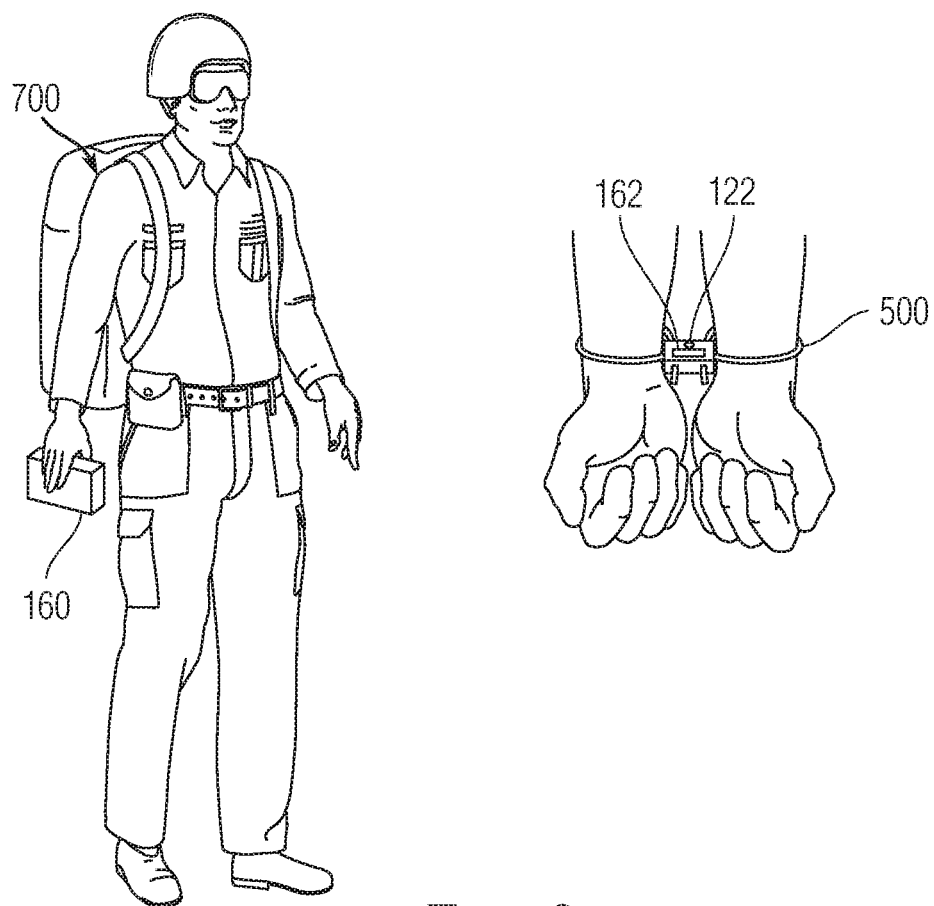
Fig. 3

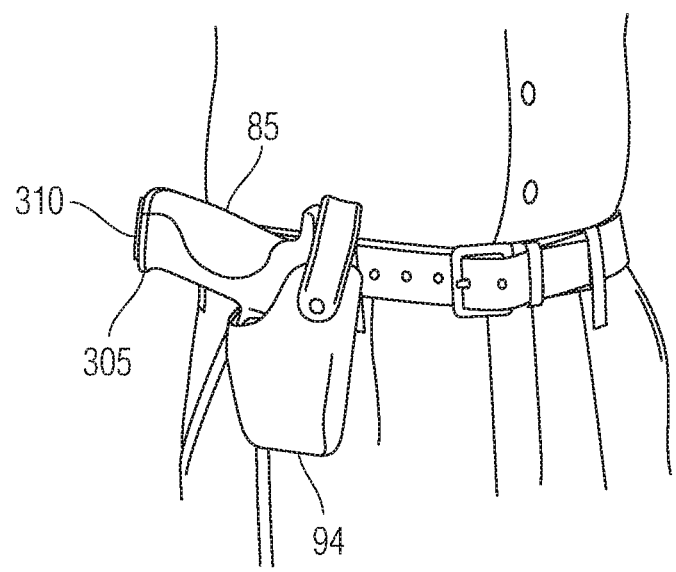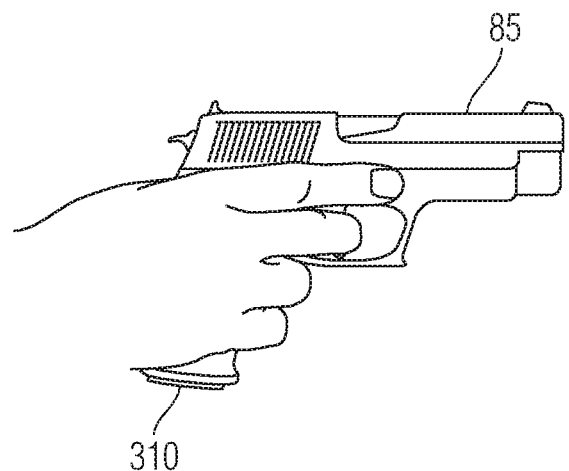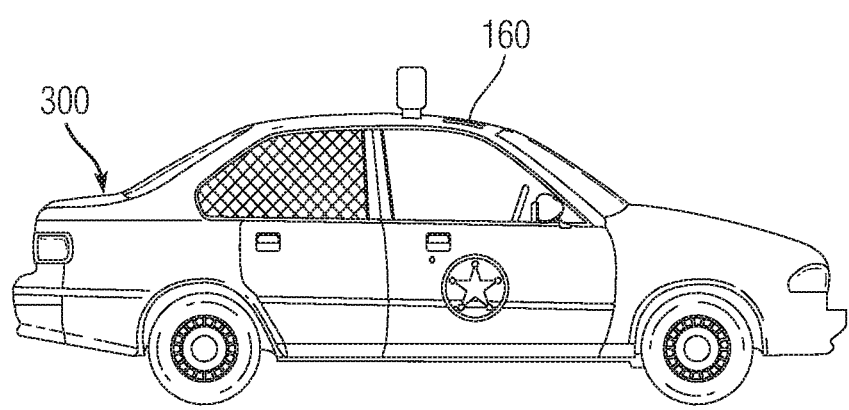
Fig. 4

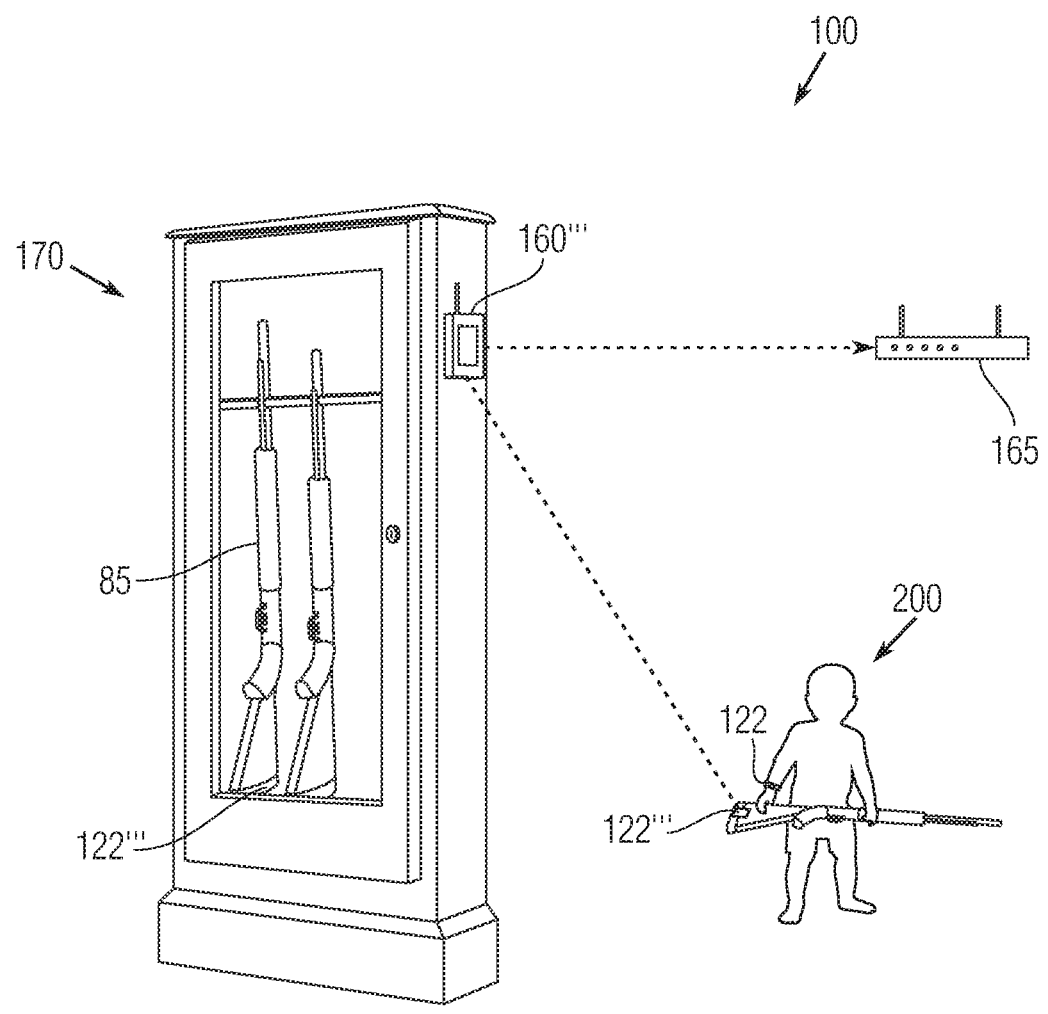
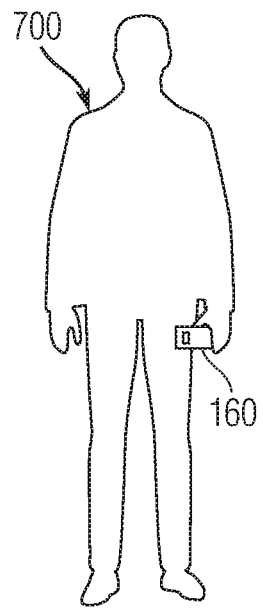
Fig. 5C

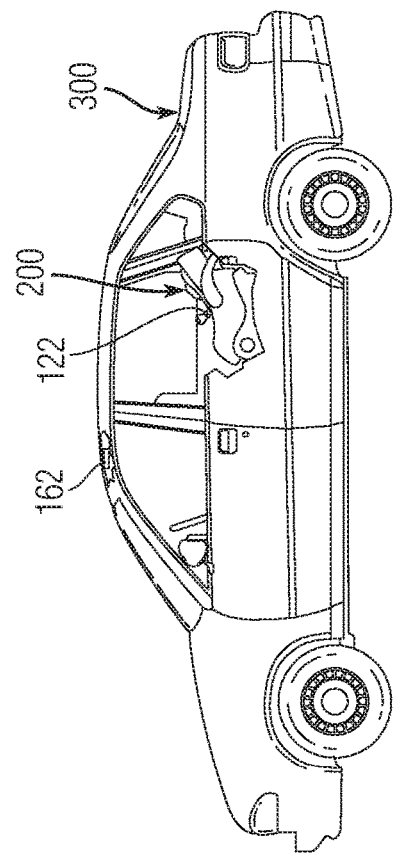
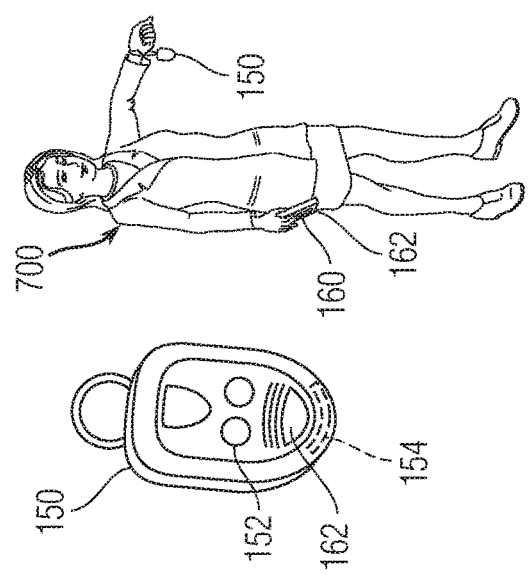
Fig. 14
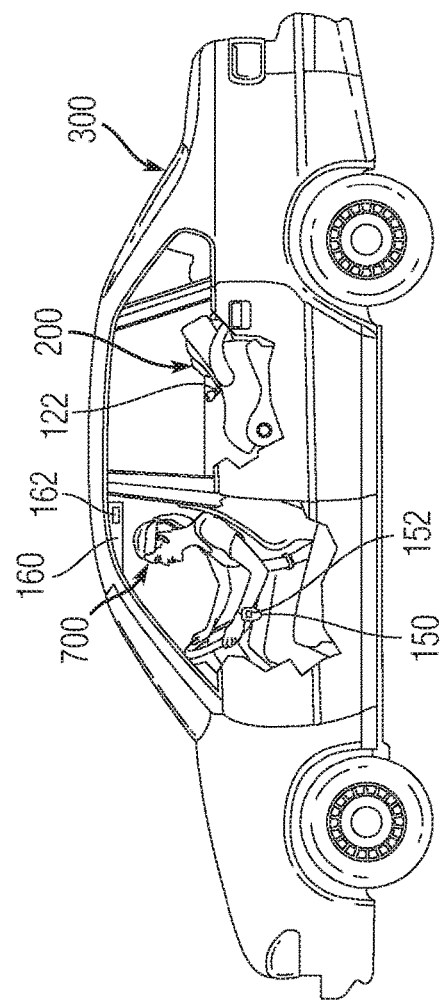
Fig. 15

ALERT SYSTEM CAPABLE OF INDICATING THE NATURE OF AN OBJECT, PERSON, OR PET

CROSS-REFERENCE TO RELATED APPLICATION

This application is a continuation of U.S. application Ser. No. 15/147,405, filed on May 5, 2016, which claims the benefit of U.S. Provisional Application No. 62/159,138, filed on May 8, 2015, the content of which are expressly incorporated herein by reference thereto.

FIELD OF THE INVENTION

The present invention relates a system and a method for indicating the nature of an object, person, or a pet.

BACKGROUND OF THE INVENTION

Items, children, and pets inadvertently are left behind (e.g., in a vehicle) by a parent or a guardian. Furthermore, both pets and children are inquisitive and may sneak out of the house, play outside of designated allowed area, simply wonder off, play with dangerous items, such as weapons, or access objects that are impermissible. Thus, a strong need exists for a system to detect and inform a parent when a pet or a child is left behind, has wondered beyond a predetermined area, or is approaching a potentially dangerous item or impermissible item.

SUMMARY OF THE INVENTION

The present invention provides an alert system including a first wireless tag; and a control device capable of being in communication with the first wireless tag. When the first wireless tag is paired with the control device and the first wireless tag and the control device move together with minimal or no change in proximity and when a motion sensor does not detect a vehicular motion, then the control device unarms itself. Additionally, when the first wireless tag is paired with the control device and the first wireless tag and the control device move together with minimal or no change in proximity and when the motion sensor detects a vehicular motion, then the control device arms itself. Once armed, when the first wireless tag and the control device at least one of (i) lose communication contact, (ii) separate a pre-determined distance, or (iii) change proximity by a pre-determined distance, then the armed control device communicates a notification to a user.

The present invention provides that the first wireless tag is at least in proximity to or is at least removably secured to a person, pet, or object of interest.

The present invention provides that the control device comprises a processor.

The present invention provides that the control device is one of hand-held computer, laptop, and cellular phone.

The present invention provides that first wireless tag and the control device communicate with each other via at least one of Bluetooth, radio frequency, RIFID, infrared, WiFi, ZigBee, Z wave, and 6LoWPAN.

The present invention provides that the motion sensor is an accelerometer.

The present invention provides that the motion sensor includes one of an algorithm and program that can match a detected motion to a corresponding activity.

The present invention provides that the motion sensor is incorporated in at least one of the control device, a device incorporating the first wireless tag, and a device separate from the control device or the device incorporating the first wireless tag.

The present invention provides that the device separate from the control device or the device incorporating the first wireless tag is one of a vehicle and key fob or watch.

The present invention provides that the notification to the user is via an alarm, a text message, a vibration, a change of color screen, a vehicle alarm system, vehicle lights, vehicle horn, vehicle emergency lights, vehicle turn signals, a vehicle sound system, or a combination thereof.

The present invention provides that the notification is communicated to the user at a predetermined time after the first wireless tag and the control device (i) separate a pre-determined distance, (ii) change proximity by a pre-determined distance, (iii) lose communication with one another, and a combination thereof.

The present invention provides that the control device comprises a pre-determined distance alert adjuster.

The present invention provides that the first wireless tag is in communication with at least one of temperature sensor, moisture sensor, odor sensor, noise sensor, smoke sensor, $CO$, $CO_2$ sensor, light sensor, vibration sensor, pressure sensor, and a chemical sensor.

The present invention provides that the chemical sensor is an air quality sensor.

The present invention provides that the alert system includes a second wireless tag in communication with at least one of the first wireless tag and the control device.

The present invention further provides that the second wireless tag is at least incorporated into, attached to, or at least removably secured to a device.

The present invention further provides that the device is at least one of key fob, watch, wallet, purse, belt, shoes, and eye glasses.

The present invention further provides that the first wireless tag and the second wireless tag are paired to the control device and wherein when the control device, the first wireless tag, and the second wireless tag move together and in proximity to each other and when the motion sensor detects a movement in a manner consistent with a motion of a vehicle, then the alert system arms itself.

The present invention further provides that the first wireless tag and the second wireless tag are paired to each other.

The present invention further provides that the first wireless tag and the second wireless tag are paired to the control device and wherein the control device, the first wireless tag, and the second wireless tag move together and in proximity to each other and when the motion sensor does not detect a movement in a manner consistent with a motion of a vehicle, then the alert system disarms itself.

The present invention further provides that the first wireless tag and the second wireless tag are paired to each other.

The present invention further provides that the second wireless tag is paired to the control device and wherein the control device and the second wireless tag move together and in proximity to each other and when the motion sensor does not detect a movement in a manner consistent with a motion of a vehicle, then the alert system disarms itself.

The present invention further provides that when the alert system is armed and the control device is not paired with the first wireless tag or the second wireless tag and when the motion sensor does not detect a movement in a manner consistent with motion of a vehicle, then the control device communicates a notification to the user.

The present invention further provides that when the alert system is armed and the control device detects that the second wireless tag is moving out of range and when the motion sensor does not detect a movement in a manner consistent with a motion of a vehicle, then the control device communicates a notification to the user.

The present invention further provides that when the alert system is armed and the control device detects the first wireless tag and the second wireless tag moving out of range and when the motion sensor does not detect a movement in a manner consistent with a motion of a vehicle, then the alert system disarms itself.

The present invention further provides that the motion sensor is part of a device that is capable of being paired to the control device.

The present invention further provides that when the first wireless tag is paired with the control device and the first wireless tag and the control device move together with minimum or no change in proximity and when the motion sensor is paired to the control device and does not detect a movement in a manner consistent with a motion of a vehicle, then the alert system disarms itself.

The present invention further provides that when the first wireless tag is out of range from the control device and the motion sensor is paired to the control device then the control device is disarmed.

The present invention further provides that when the first wireless tag is paired with the control device and the first wireless tag and the control device move together with minimum or no change in proximity and when the motion sensor is paired to the control device and detects a movement in a manner consistent with a motion of a vehicle, then the alert system is armed.

The present invention further provides that when the first wireless tag and the control device separate by a predetermined distance and the motion sensor is paired to the control device and detects a movement in a manner consistent with a motion of a vehicle, then the control device communicates a notification to the user.

The present invention provides that an alert system that includes a wearable device including a motion sensor capable of detecting different types of motion, and a wireless transmitter capable of sending a signal in response to a signal generated by the motion sensor. The alert system also includes a receiver capable of receiving the signal from the wireless transmitter and in response generating an alert signal to a user of the receiver.

The present invention further provides that the motion sensor is an accelerometer capable of detecting and distinguishing: no movement, walking movement, running movement, cycling movement, horse riding movement, and motorized transportation movements.

The present invention further provides that the accelerometer includes one of an algorithm/processing routine and program that enables the accelerometer to match a detected acceleration to one of no movement, walking movement, running movement, cycling movement, horse riding, and motorized transportation movements.

The present invention further provides that the wearable device is capable of determining its location.

The present invention further provides that the wearable device is capable of determining its location by one of a GPS and cell towers.

The present invention further provides that the determined location can be communicated to the receiver by the wireless transmitter.

The present invention further provides that the receiver is capable of saving the determined location.

The present invention provides an alert system that includes a distance detector capable of sending a wireless transmission, and a transmission receiving device capable of receiving the distance detector's wireless transmission and generating a signal in response.

The present invention further provides that the transmission receiving device stops receiving the transmission from the distance detector once the distance detector is a predetermined distance away from the transmission receiving device.

The present invention further provides that when the transmission receiving device stops receiving the signal from the distance detector, then the transmission receiving device sends a notification to a user.

The present invention provides a system for providing remote notice that a user has been separated from a belonging. The system includes a motion sensor for detecting that a vehicle is in motion, a first wireless tag, and a control device capable of receiving a signal from the motion sensor and the first wireless tag and generating a response.

The present invention provides an alert system including a wireless tag at least one of positioned on, secured on, and incorporated into a portion of a follower of a magazine and a wireless transmission signal receiving and sending device at least one of positioned on, secured on, and incorporated into a portion of a weapon and is capable of notifying a user of an event. When the wireless tag is at a first position, the wireless transmission signal receiving and sending device does not send a notification to the user and when the wireless tag is at a second position, the wireless transmission signal receiving and sending device sends a notification to the user.

The present invention further provides that the first position of the wireless tag is at a first distance from the wireless transmission signal receiving and sending device and the second position of the wireless tag is at a second distance from the wireless transmission signal receiving and sending device, and wherein the first distance is shorter than the second distance.

The present invention further provides that the notification to the user is in a form of LED, sound, vibration, or a combination thereof.

The present invention further provides that the event occurs when there is a predetermined number of ammunitions left in the magazine.

The present invention further provides that the event occurs when the magazine is empty.

The present invention further provides an alert system that includes a wireless tag at least one of secured on and incorporated into a portion of each plurality of ammunitions and a wireless transmission signal receiving and sending device at least one of positioned on, secured on, and incorporated into a portion of a weapon and is capable of notifying a user of an event. When at least one ammunition is in the magazine or chamber of the weapon, then the wireless transmission signal receiving and sending device receives a signal from the wireless tag, which is an indication of no event. Additionally, when there are no ammunitions in the magazine or chamber of the weapon, then the wireless transmission signal receiving and sending device does not receive a signal, which is an indication of an event, thus, the wireless transmission signal receiving and sending device sends a notification to the user.

The present invention further provides that the notification to the user is in a form of LED, sound, vibration, or a combination thereof.

The present invention further provides that the event occurs when there is a predetermined number of ammunitions left in the magazine.

The present invention further provides that the event occurs when the magazine is empty.

The present invention provides an alert system including a wireless tag at least one of positioned on, secured on, or incorporated into a portion of a weapon and a wireless transmission signal receiving and sending device at least one of positioned on, secured on, or incorporated into a weapon harness. When the weapon is in the weapon harness, the wireless transmission signal receiving and sending device receives a signal from the wireless tag, which is an indication of no event. Additionally, when the weapon is not in the weapon harness, then the wireless transmission signal receiving and sending device does not receive a signal, which is an indication of an event, thus, the wireless transmission signal receiving and sending device sends a notification to the user.

The present invention further provides that the notification to the user is in a form of LED, sound, vibration, or a combination thereof.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

The present invention in its several aspects and embodiments solves the problems discussed herein and significantly advances the technology of keeping track of loved ones and items. The present invention can become more fully understood from the detailed description and the accompanying drawings, wherein:

FIG. 1 illustrates an alert system capable of reminding a law enforcement agent to load and carry his weapon;

FIG. 2A illustrates an alert system capable of reminding a law enforcement agent to load his weapon;

FIG. 2B illustrates an alert system capable of reminding a law enforcement agent that the weapon is in its holster;

FIG. 3 illustrates an alert system capable of notifying a military or police personal of a fleeing militant or prisoner;

FIG. 4 illustrates an alert system capable of notifying a police station whether an officer has pulled his/her weapon out of its holster;

FIG. 5C illustrates an alert system that alerts a user when a child is approaching a potentially dangerous item;

FIG. 14 illustrates an alert system including a motion sensor incorporated into a control device, a first wireless tag, and a second wireless tag;

FIG. 15 illustrates an alert system including a motion sensor incorporated into an external device, a first wireless tag, and a second wireless tag;

Throughout this specification and figures like reference numbers identify like elements.

DETAILED DESCRIPTION OF THE INVENTION

Figure 5A:
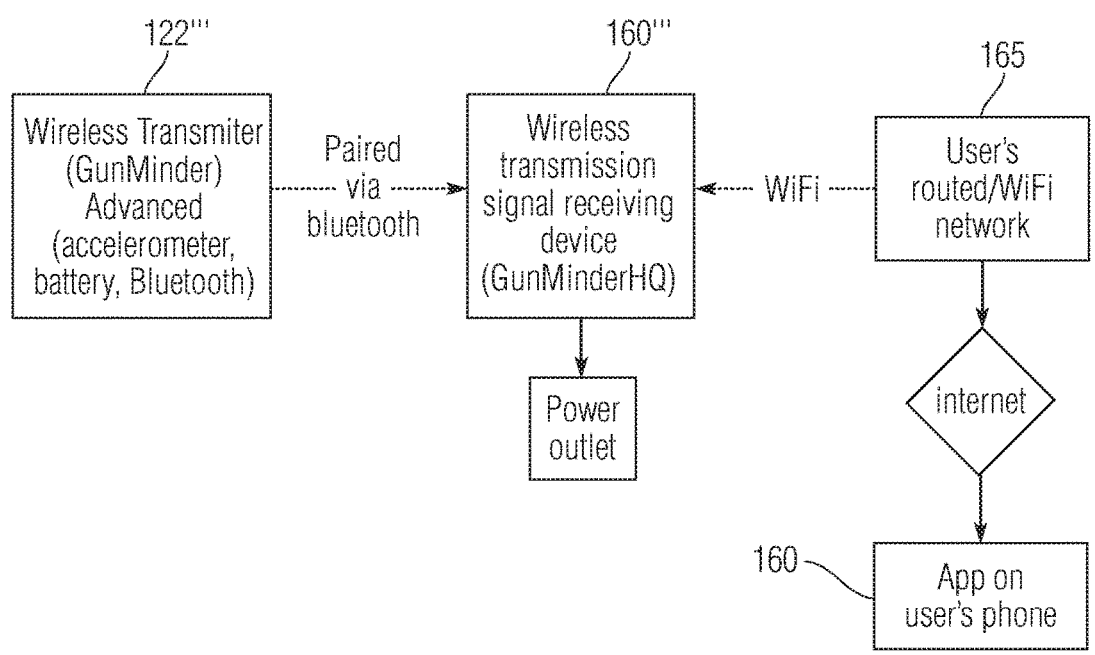
FIG. 5A is a flow diagram illustrating for an alert system that informs a user that a weapon has been removed from its location.

In its broad and varied embodiments, the invention disclosed herein relates to an alert system that notifies, reminds, or tells a user that he/she forgot someone or something of value. The alert system can also alert the user when a prisoner, a person, and/or a pet has moved too far away from the user. Alternatively, the alert system can be used when a person of interest has approached or has come to close to a dangerous area or a dangerous item. The alert system can be used by pet owners, parents, law enforcements, and military personnel. In an embodiment, if a pet crosses the yard-line, the alert system can alert, notify, and/or inform the pet owner before the pet has an opportunity to endanger himself by the perils in the street. In another embodiment, if a parent leaves the child in a vehicle by accident, the alert system can alert, notify, and/or inform the parent that the child is still in the vehicle. In yet another embodiment, if a police officer forgets his/her weapon or forgets to load the weapon, the alert system can alert, notify, and/or inform the police officer that the weapon is left behind or that it is not loaded. In another embodiment, if a child comes too close to a medicine cabinet or a weapon, the alert system can inform the parent that their child has approached the medicine cabinet or their gun. The alert system can also be used to detect a theft of an item, such as when a bicycle or a weapon has been removed from its proper location without the owner's knowledge. In an embodiment, the alert system can be used as a home security system and can alert a user if there is a break-at the house or office. In yet another embodiment, when military personnel arrest a group of militants, if one or more of the militants attempt to flee the area, the alert system alerts the military personal that one or more of the militants are fleeing.

In each of the embodiments described below the terms alert, notify, remind, inform their respective derivatives, and their respective gerund forms are used interchangeably. Furthermore, the term weapon can be defined as any type of device that can potentially cause harm, including but not limited to firearms, such as guns, and knives. Additionally, the phrase "out of range" can be defined as a distance at which two devices (i) no longer communicate with one another, (ii) are no longer paired to one another, or (iii) are a predetermined threshold distance away from one another. The phrase "lose communication" can be defined as a distance at which two devices (i) are no longer communicating with one another, (ii) are no longer paired to one another, or (iii) are a predetermined threshold distance away from one another. The phrase "predetermined threshold distance" can be defined as a distance at which two devices (i) no longer communicate with one another, (ii) are no longer paired to one another, or (iii) are at a distance that is pre-programmed by the user. Additionally, the term "accelerometer" can be any type of motion detector or sensor, such as, vibration sensor, gyroscope, passive infrared, active infrared, optic-based, piezoelectric, and ultrasonic to name a few. Furthermore, the term "wireless" can be any type of wireless communication or data transfer devices, such as a WiFi, Blue Tooth, and other wireless data transferring and/or receiving devices.

Exemplary Military and Law Enforcement Applications

FIG. 1 illustrates an exemplary embodiment of the alert system of the present invention that is capable of notifying or reminding a law enforcement agent to load and/or carry his weapon. In an embodiment, the alert system 100 includes a wireless transmitter 122' capable of sending a wireless transmission and a wireless transmission signal receiving device 160' capable of receiving the wireless transmission signal generated by the wireless transmitter 122'. The alert system 100 can be used by law enforcement agents to (i) remind them to load their weapon and/or (ii) remind them to take their weapon with them. To confirm that the weapon is loaded or to let the user know that the weapon needs to be reloaded, an ammunition 10 can include a bullet 20, a bullet case 40, propellant 60, a rim 80, and a wireless transmitter 122'. The wireless transmitter 122' can be secured to any part of the ammunition 10 that would not interfere with the loading, firing, or traveling characteristics of the ammunition 10. For example, the wireless transmitter 122' can be secured to the tip of the bullet 20, an inner portion of the casing, or a portion of the rim 80, as shown in FIG. 1. The wireless transmitter 122' is capable of sending a wireless transmission signal as far as a few feet or less. For example, the wireless transmission signal can travel to about 50 feet or less, such as from about 0.25 in to about 120 in, or from about 0.25 in to about 60 in, or from about 1 in to about 12 in, such as from 1 in to 2 in. The wireless transmission can be generated by a blue tooth device, radio frequency generator device, Infrared device, an RFID; however, it is not limited to these types of wireless transmission devices. The wireless signal can be received by a wireless transmission signal receiving device 160'. The wireless transmission signal receiving device 160' can be a hand-held device, such as a cellular phone, or can be secured on or incorporated into a portion of a weapon 85. In an example, the wireless transmission signal receiving device 160' includes an alert mechanism/device that is capable of alerting a user when the weapon 85 needs to be loaded or re-loaded. The alert mechanism can be by a sound generated by a speaker 90 or a light, such as LEDs 92. However other alerting mechanism can also be used, such as a vibration generating device, for example a piezoelectric.

In action, if a magazine 96 or a weapon chamber 97 of the weapon 85 does not include an ammunition 10 having the wireless transmitter 122', the wireless transmission signal receiving device 160' will not receive a signal from the wireless transmitter 122' secured to a portion of the ammunition 10. In this particular example, no signal is an indication that the weapon 85 does not have any ammunition 10. As a result, the wireless transmission signal receiving device 160' generates an alert signal to the speaker 90 and/or the LEDs 92 to notify the user that the weapon 85 is empty. When the user inserts the ammunition 10 having the wireless transmitter 122' into the magazine 96 or the weapon chamber 97 of the weapon 85, the distance from the wireless transmitter 122' secured to a portion of the ammunition 10 to the wireless transmission signal receiving device 160' will be sufficiently short for the transmission sent from the wireless transmitter 122' to be received by the transmission signal receiving device 160'. Thus, the transmission signal receiving device 160' will not generate a signal to the speaker 90 or the LEDs 92. Once the last ammunition 10 is fired, the wireless transmitter 122' secured to a portion of the ammunition 10 is destroyed and thus the wireless transmission signal receiving device 160' stops receiving a transmission from the wireless transmitter 122'. As a result and in response, the wireless transmission signal receiving device 160' sends a signal to the speaker 90 or the LEDs 92 to alert or notify the user that the weapon is out of ammunition 10.

FIG. 2A illustrates an alternative exemplary embodiment of the alert system of the present invention that is capable of notifying or reminding a law enforcement agent to load his weapon 85. In this alternative exemplary embodiment, instead of each ammunition 10 having a wireless transmitter 122', the wireless transmitter 122' can be secured to or be incorporated into a portion of a weapon magazine 96. For example, the wireless transmitter 122' can be secured to or be incorporated into the follower 98 of the weapon magazine 96.

In this example, when the follower 98 is in the first position 98A (i.e., at a distance D from the transmission signal receiving device 160'), the transmission signal receiving device 160' does not receive a signal from the wireless transmitter 122'. In this particular example, no signal can be an indication that the weapon magazine 96 has ammunition. As the ammunitions 10 are used, the follower 98 approaches its second position 98B, which is a distance DD away from the transmission signal receiving device 160'. At the second position 98B, the transmission signal receiving device 160' receives a signal from the wireless transmitter 122'. In this exemplary embodiment, the receipt of the signal from the wireless transmitter 122' is an indication that magazine 96 is out of ammunitions 10. Thus, in response, the transmission signal receiving device 160' sends a signal to alert or notify the user that the weapon is out of ammunition 10. This signal can be sent to a speaker 90 to make a sound, a piezoelectric to generate a vibration, an LED, or a plurality of LEDs 92 to illuminate, or to a combination of the speaker 90, piezoelectric, and the LEDs 92 to make a sound, make a vibration, and/or illuminate the LEDs and alert the user that the weapon is out of ammunition 10.

In another example, as the follower 98 approaches its second position 98B, the signal between the wireless transmitter 122' and the transmission signal receiving device 160' becomes stronger. As the signal becomes stronger, the signal illuminates an LED or a different color LED. In one embodiment, the notification LED 92 includes different colors. For example, each color can correspond to the number of ammunitions left in the magazine. For instance, color red can be an indication that there are no ammunitions left in the magazine, the color orange can be an indication that there is one ammunition left in the magazine, the color yellow can be an indication that there are two ammunitions left in the magazine, the color green can be an indication that there are three ammunitions left in the magazine, and when no LEDs are on, it is an indication that there are four or more ammunitions left in the magazine. Alternatively, instead of a single LED changing color, as the follower 98 having the wireless transmitter 122' approaches position 98B, more LEDs turn on. For example, then there are 4 ammunitions 10 left in the magazine 98, a single LED turns on. When there are only 3 ammunitions 10 left in the magazine 98, two LEDs turn on. When there are only 2 ammunitions 10 left the in magazine 98, three LEDs turn on. When there is only 1 ammunition 10 left in the magazine 98, four LEDs turn on and when there are no ammunitions left in the magazine 98 and/or chamber 97, then five LEDs turn on.

In one exemplary embodiment, the wireless transmitter 122' can be a magnetic field generator (e.g., a magnet) and the wireless transmission signal receiving device 160' can be a magnetic field detector. In one example, each bullet 20 and/or each bullet case 40 can include a magnetic material. In another example, the follower 98 or a portion thereof is magnetic or includes magnetic properties or materials. The magnetic material is in an amount sufficient for the magnetic field detector to be able to detect the magnetic field generated by the magnetic material in each bullet 20 and/or each bullet case 40.

As stated above, in one exemplary embodiment, the ammunitions or a portion of the ammunitions has magnetic properties or includes magnetic materials. In this example, if a magazine 96 or a weapon chamber 97 of the weapon 85 does not include ammunition 10 having the magnetic material or magnetic properties, the magnetic field detector will not be able to detect a magnetic field. In this particular example, the lack of detecting a magnetic field is an indication that the weapon 85 does not have any ammunition 10. As a result, the magnetic field detector generates an alert signal to the speaker 90 and/or the LEDs 92 to notify the user that the weapon 85 is empty. When the user inserts the ammunition 10, having the magnetic material, into the magazine 96 or the weapon chamber 97 of the weapon 85, the magnetic field detector detects a magnetic field. Thus, the magnetic field detector will not generate a signal to the speaker 90 or the LEDs 92. Once the last ammunition 10 is fired, the magnetic field is lost the magnetic field detector will not detect a magnetic field. As a result and in response, the magnetic field detector sends a signal to the speaker 90 or the LEDs 92 to alert or notify the user that the weapon is out of ammunition 10.

As stated above, in another exemplary embodiment, the follower 98 or a portion thereof is magnetic or includes magnetic properties. In this example, when the follower 98 having magnetic characteristics is in the first position 98A (i.e., at a distance D from the magnetic field detector), the magnetic field detector does detect a magnetic field from the follower 98 having magnetic characteristics. In this particular example, no signal can be an indication that the weapon magazine 96 has ammunition. As the ammunitions 10 are used, the follower 98 having magnetic characteristics approaches its second position 98B, which is a distance DD away from the magnetic field detector. At the second position 98B, the magnetic field detector detects the magnetic field generated by the follower 98 having magnetic characteristics. In this exemplary embodiment, the detection of the magnetic field is an indication that magazine 96 is out of ammunitions 10. Thus, in response, the magnetic field detector sends a signal to alert or notify the user that the weapon is out of ammunition 10. This signal can be sent to a speaker 90 to make a sound, a piezoelectric to generate a vibration, an LED, or a plurality of LEDs 92 to illuminate, or to a combination of the speaker 90, piezoelectric, and the LEDs 92 to make a sound, make a vibration, and/or illuminate the LEDs and alert the user that the weapon is out of ammunition 10.

In another example, as the follower 98 having magnetic characteristics approaches its second position 98B, the magnetic field detector detects a stronger magnetic field. As the magnetic field detector detects stronger magnetic field, the magnetic field detector generates a signal to illuminate an LED or a different color LED. In one embodiment, the notification LED 92 includes different colors. For example, each color can correspond to the number of ammunitions left in the magazine. For instance, the color red can be an indication that there are no ammunitions left in the magazine, the color orange can be an indication that there is one ammunition left in the magazine, the color yellow can be an indication that there are two ammunitions left in the magazine, the color green can be an indication that there are three ammunitions left in the magazine, and when no LEDs are on, it is an indication that there are four or more ammunitions left in the magazine. Alternatively, instead of a single LED changing color, as the follower 98 having magnetic characteristics approaches position 98B, more LEDS turn on. For example, then there are 4 ammunitions 10 left in the magazine 98, a single LED turns on. When there are only 3 ammunitions 10 left in the magazine 98, two LEDs turn on. When there are only 2 ammunitions 10 left the in magazine 98, three LEDs turn on. When there is only 1 ammunition 10 left in the magazine 98, four LEDs turn on and when there are no ammunitions left in the magazine 98 and/or chamber 97, then five LEDs turn on.

In an embodiment, as shown in FIG. 2B, which reminds a law enforcement agent to place his weapon 85 in a holster 94, the weapon 85 can include a wireless transmitter 122" and the holster 94 can include a transmission signal receiving device 160". In an alternative embodiment, the transmission signal receiving device 160" can be incorporated into or be secured to a cell phone. In another alternative embodiment the system includes two transmission signal receiving devices 160" one being incorporated into or attached to a portion of the holster 94 and one being incorporated into or be secured to a smart phone or an electronic device. When the weapon 85 is not in the holster 94, the transmission signal receiving device 160" will not receive a transmission signal from the wireless transmitter 122". In this particular example, no signal is an indication that the weapon 85 is not in its holster 94. As a result, the transmission signal receiving device 160" will generate an alert signal to notify the user that the weapon 85 is not in the holster 94. This signal can be sent to a speaker 90 or a plurality of LEDs 92 on the holster 94, to a speaker or screen of another device, such as a smart phone, and/or to a central location, such as a police department. In an example, when the police department receives a signal indicating that the weapon 85 is not in its holster 94, it may be an indication that the weapon 85 is drawn and is being used. In this example, the signal received by the police department may also include the current location or the last location of the transmission signal receiving device 160". In response, the police department can dispatch another law enforcement officer to that location or open communication with the law enforcement officer in that location. In one example, each transmission signal receiving device 160" is assigned to a particular law enforcement officer.

In one exemplary embodiment, when the transmission signal receiving device 160" does not receive a transmission signal from the wireless transmitter 122", a predetermined time passes before the transmission signal receiving device 160" generates an alert signal to notify the user that the weapon 85 is not in the holster 94. This is particularly useful when the user pulls the weapon 85 out of the holster 94 for use. The predetermined time can be from about 10 minutes or more to about 1 minute or less. For example, the predetermined time can be from about 1 minute to about 10 minutes, or from about 2 minutes to about 9 minutes, or from about 3 minutes to about 8 minutes, or from about 4 minutes to about 7 minutes, or from about 5 minutes to about 6 minutes. In one example, the predetermined time can be programmed by the user. In this particular example, the holster 94 can include an interface that would allow the user to program a time delay. In another example, the time delay can be programmed by a separate device, such as a laptop, desktop, tablet, or smart phone. In this example, the separate device has the capability to communicate the time delay to the transmission signal receiving device 160" and the transmission signal receiving device 160" has the capability to implement the time delay.

In an embodiment, the user can be notified that the weapon 85 is out of ammunition 10 and/or that the weapon 85 is not in its holster 94. In this embodiment, the wireless transmitter 122' can include a signal that has a frequency or wavelength that is different from the frequency or wavelength of the wireless transmitter 122". Accordingly, the transmission signal receiving devices 160' and 160" can distinguish whether the weapon 85 needs to be re-loaded or that the weapon 85 is not in its holster 94.

In an embodiment of the present invention, the wireless transmitter 122' is capable of sending two signals having two different wavelengths. The first signal corresponds to the transmission signal receiving device 160', which notifies a user if the magazine 96 is empty and the second signal corresponds to the transmission signal receiving device 160", which notifies the user that the weapon is not in its holster 94.

FIG. 3 illustrates an alert system that can notify or inform a military personal or a police officer that at least one of the arrested persons or militants is attempting to flee an area. As shown in FIG. 3, the alert system 100 can include handcuff 500, a first wireless tag 122, a motion sensor 162, and a control device 160. The handcuff 500 can be a metal handcuff, hard plastic handcuff, or zip tie handcuff to name a few. The motion sensor 162 can be an accelerometer or a gyroscope, and the control device 160 can be any device capable of receiving a transmission from the first wireless tag 122 and in response determine whether to alert a user 700 (e.g., a military personal or a police officer). For example, the control device 160 can be a smart phone, a hand held computer, or another electronic device having a processor. In one example, the first wireless tag 122 and the motion sensor 162 can be secured to or be incorporated into the handcuff 500. Furthermore, the first wireless tag 122 can be paired to or linked to the control device 160.

In an embodiment, the alert system 100 can disarm itself when the first wireless tag 122 is paired with the control device 160 and the motion sensor 162 does not detect any motions. For example, if the control device 160 and a set of handcuffs 500 having the first wireless tag 122 and the motion sensor 162 are in a storage unit, the motion sensor 162 determines that there is no movement. This information is relayed to the control device 160, which in-turn determines that, because of lack of movement, there is no danger of someone fleeing. As a result, the control device 160 disarms the alert system 100. In another example, the arrested and handcuffed group of criminals and/or militants is lying on the floor facing down. As such, the motion sensor 162 determines that there is minimum or no motion. This information is relayed to the control device 160, which in response determines that there is no danger of someone fleeing. As such, the control device 160 disarms the alert system 100.

In an embodiment, the alert system 100 arms itself when the first wireless tag 122 is paired with the control device 160 and the motion sensor 162 detects movement. For example, if a criminal and/or militant who has been arrested and/or handcuffed by handcuff 500 starts to move, the motion sensor 162 detects the movement and informs the control device 160 that a movement has been detected. In response, the control device 160 concludes that the handcuffed militant may make an attempt to flee the area. Accordingly, the control device 160 arms the alert system 100.

In an embodiment, the alert system 100 can send a notification to a user (e.g., a military personal or a police officer) when the motion sensor 162 detects a movement and the first wireless tag 122 and the control device 160 lose communication. Alternatively or additionally, the control device 160 can include a program or an application that enables the user 700 to adjust or program a predetermined threshold distance between the first wireless tag 122 and the control device 160 for a notification to be sent out. For example, if one of the handcuffed criminals and/or militants starts to run away while the user 700 is preoccupied, once the control device 160, carried by the user 700, loses communication with the first wireless tag 122 (or if the distance between the control device 160 and the first wireless tag 122 reaches a predetermined threshold distance), the control device 160 will conclude that the criminal and/or militant is fleeing the area. As such the control device 160 sends a notification to the user 700. The notification can be in a form of a sound, vibration, visual display, or a combination thereof.

In an embodiment, the user 700 carrying the control device 160 can program the control device 160 to notify him if any of the first wireless tags 122 are at a distance greater than the predetermined threshold distance. For example, the predetermined threshold distance can be set at from about 10 feet or less to 500 feet or more, such as from about 10 feet to 200 feet, or from about 20 feet to about 100 feet, or from about 30 feet to about 50 feet. For example, if the user 700 programs the control device 160 to notify him when a handcuffed criminal and/or militant is more than 50 feet away, when the criminal and/or militant starts to move the alert system 100 arms itself. When the criminal and/or militant is approximately 50 feet away from the control device 160, then the control device 160 determines that the militant is fleeing the area and alerts the user 700.

In each of the exemplary embodiments described above and below, the motion sensor 162 can include an algorithm or a program which can distinguish different types of acceleration or can match a detected acceleration or motion to a type of/corresponding activity. For Example, the algorithm and/or the program allows the motion sensor 162 to determine whether the acceleration or the movement of the object or person having the motion sensor 162 corresponds to a crawling movement, walking movement, running movement, fighting movement, riding a horse, or even driving a vehicle or other power operated transportation devices. In one exemplary embodiment, the algorithm or the program can be incorporated into the control device 160 or other devices, such as the first wireless tag 122.

Exemplary Civil Applications

The alert system 100 of the present invention can also notify a police department that an officer has drawn his/her weapon 85. As shown in FIG. 4, the alert system 100 can include a gyroscope 310 that is includes or is in communication with a transmitter. The gyroscope 310 can be secured on a surface of the weapon 85. For example, the gyroscope 310 can be secured to a portion of the magazine 305 of the weapon 85. When the weapon 85 is in its holster 94, the bottom surface of the weapon's magazine 305 is not parallel or substantially parallel to the ground. Thus, the gyroscope's transmitter can send a signal to the police vehicle 300 stating that the weapon 85 has not been drawn. However, when the weapon 85 is drawn, the bottom surface of the weapon's magazine 305 is substantially parallel to the ground. The gyroscope 310 can detect that the bottom surface of the weapon's magazine 305 is not substantially parallel to the ground and as a result will send a signal to a receiver 160 in the police vehicle 300. The receiver 160 can in return communicate with the computer system in the vehicle 300 to alert the police station that the officer has pulled his/her gun out of its holster 94.

In an embodiment of the present invention, the alert system 100 is capable of detecting when a weapon 85 has been removed from its location. In another embodiment, the alert system 100 is capable of detecting when a child has come too close to a dangerous item, such as a cabinet 170 containing medicine or weapons or a weapon 85.

Figure 5B:
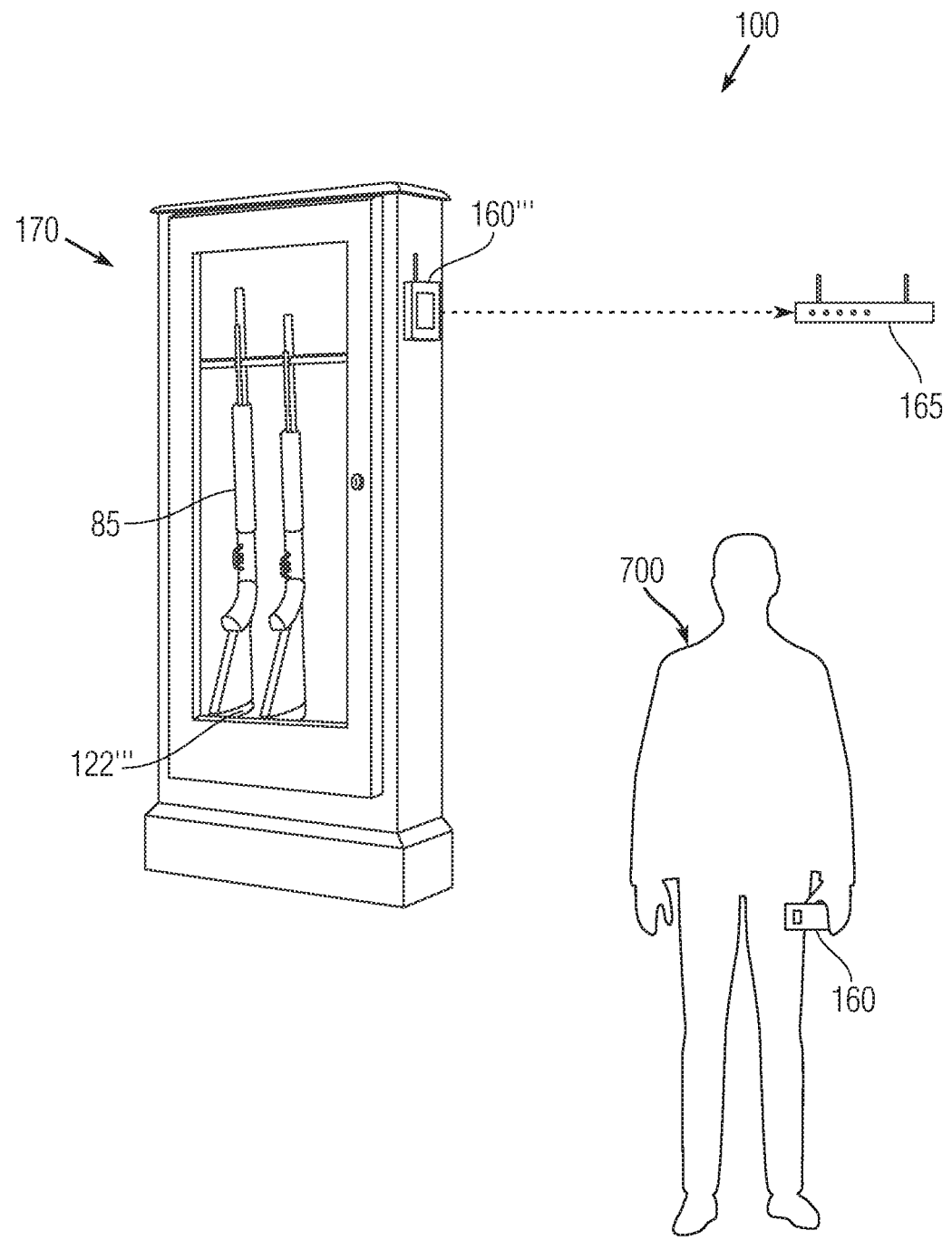
FIG. 5B illustrates the alert system, corresponding to the flow diagram in FIG. 5A, having a transmitter, a receiver, a WiFi connector and an optional accelerometer and GPS.

FIGS. 5A and 5B illustrate the alert system 100 that is capable of detecting when one of the plurality of weapons 85 has been removed from its location. The alert system 100 can include a wireless transmitter 122''' capable of sending a wireless transmission and a wireless transmission signal receiving device 160''' capable of receiving one or a plurality of different wireless transmission signals generated by one or a plurality of wireless transmitters 122'''. In an exemplary embodiment, the weapon 85 may be located anywhere in the house, for example, in a cabinet 170. The weapon 85 can include a wireless transmitter 122'''. The wireless transmitter 122''' can be secured to any portion of the weapon 85. For Examiner, as shown in FIG. 5B, the wireless transmitter 122''' can be secured to a portion of the rifle's butt. The rifle's butt can also include a power source, such as a battery, an accelerometer (not shown in the figure), and/or a global positioning system (GPS) (also not shown in the figure) in communication with the wireless transmitter 122''' and/or the wireless transmission signal receiving device 160'''.

The wireless transmission signal receiving device 160''' can be located at any area so long as it can communicate with the wireless transmitter 122'''. For Example, as shown in FIG. 5B, it can be attached to the cabinet 170 or it can be attached to a wall in a house or an office. The wireless transmission signal receiving device 160''' can be connected to the internet via router and/or WiFi network 165 that can send information to a user 700 phone application.

In one example, when one or more of the weapons 85 have been moved, the accelerometer can detect the movement. As a result, it wakes-up the wireless transmitter 122''' to send a signal to the wireless transmission signal receiving device 160''' stating that a movement of one of the weapons 85 has been detected. The wireless transmitter 122''' can then continuously send a signal to the wireless transmission signal receiving device 160''' to confirm that the weapon has not moved passed a predetermined distance from the wireless transmission signal receiving device 160'''. If the weapon 85 is moved beyond a predetermined distance, the wireless transmission signal receiving device 160''' can send a message via internet to the user's application stating that fact. Moreover, in one exemplary embodiment, the wireless transmitter 122''' is also capable of receiving a confirmation signal from the wireless transmission signal receiving device 160''' stating that the signal was received. If the alert system 100 includes a GPS and the confirmation signal generated and sent by wireless transmission signal receiving device 160''' is not received by the wireless transmitter 122''', the GPS can be activated so that the user can track the removed weapon 85.

In one example, each wireless transmitter 122''' on each of the weapons 85 has its own unique code so that the user can determine which of the weapons 85 has been moved. In one example, each code can be renamed to the name of the weapon for example code 0001 can be renamed as Remington Sendero SF11, and code 0002 can be renamed as Marlin 336C.

FIG. 5C illustrate the alert system 100 that is capable of detecting when a child has come too close to a dangerous item, such as a cabinet 170 containing medicine or weapons or a weapon 85. In this example, a child 200 can be wearing an item (such as a watch) that contains a wireless tag 122. In one example, the wireless transmission signal receiving device 160''' can be positioned at a predetermined distance away from the weapon 85 or a medicine cabinet. Once the child is within a predetermined distance away from the wireless transmission signal receiving device 160''', it can detect the child 200 and in response can alert the user 700. In another embodiment, the wireless transmission signal receiving device 160''' may be placed anywhere so long as it can communicate with the wireless transmitter 122''' on each of the weapons 85 and the wireless tag 122 carried by the child 200. In this embodiment, the wireless transmission signal receiving device 160''' can determine the distance of the child from the weapon by triangulation and once the child 200 reaches a predetermined distance away from the weapon, the wireless transmission signal receiving device 160''' can alert the user 700.

A similar alert system can be used to determine the location of a child 200 with respect to any item that may cause a harm to the child. For example, to a medicine cabinet, kitchen, or if a child leaves the house without supervision of an adult in the family.

Figure 6:
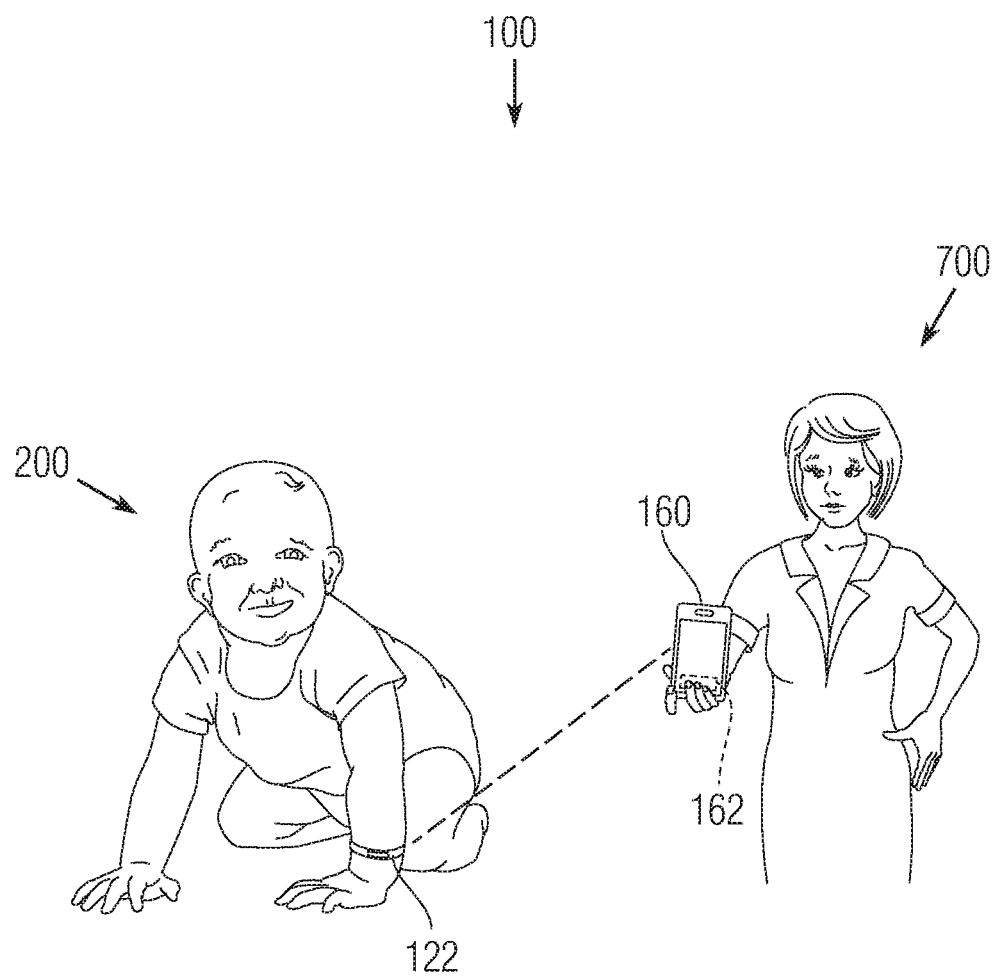
FIG. 6 illustrates an alert system capable of notifying a user when he is a predetermined distance away from a child.

In an exemplary embodiment, as shown in FIG. 6, the alert system 100 can include a first wireless tag 122, a control device 160, and a motion sensor 162. The motion sensor 162 can be an accelerometer. The motion sensor 162 can detect different types of motions, such as walking motion, running motion, or vehicle motion, to name a few. The motion sensor 162 (i) can be a standalone motion sensor, such as a motion sensor incorporated in a vehicle, (ii) can be incorporated into or be attached to the control device 160, such as an accelerometer in a smart phone, (iii) can be incorporated into or attached to a third device, such as a key fob, or (iv) can be incorporated into or attached to the first wireless tag 122. In one example, as shown in FIG. 6, the motion sensor 162 is incorporated into the control device 160. Some control devices 160, such as smart phones, have a built-in motion sensor 162 and, as such, there is no need to attach or incorporate another motion sensor 162 to such devices.

The control device 160 can be any device that is capable of notifying a user of an event based on a signal received or not received from the first wireless tag 122. In one example, the control device 160 includes a processor. Some exemplary control devices 160 include, but are not limited to, smart phones, laptops, i-watch, Samsung Gear S, and tablets. In an embodiment, the control device 160 can be incorporated into a device, such as a key fob or a vehicle key itself. It could also be incorporated into the vehicle itself or into a device that plugs into the vehicle's diagnostic or other port. In an example, wherein the control device 160 is incorporated into vehicle key itself, the control device 160 can be charged when the vehicle key is placed in the car ignition.

In an embodiment of the present invention, the first wireless tag 122 and the control device 160 can communicate with each other or can be linked and/or paired to one another by any method known to one skilled in the art. For example, they can communicate with each other or can be linked and/or paired to one another with each other by Bluetooth, radio frequency, cellular phone towers/network, RFID, Infrared, and/or WiFi, to name a few.

In action, the wireless tag 122 is attached or removably attached to an item of interest, a child 200, or a pet. For example, as shown in FIG. 6, the wireless tag 122 can be clipped on or be connected to a child's cloth or can be incorporated into an accessory, such as a bracelet or a watch worn by child 200. In this example, the control device 160 can be a smart phone, which includes a motion sensor 162.

Figure 7:
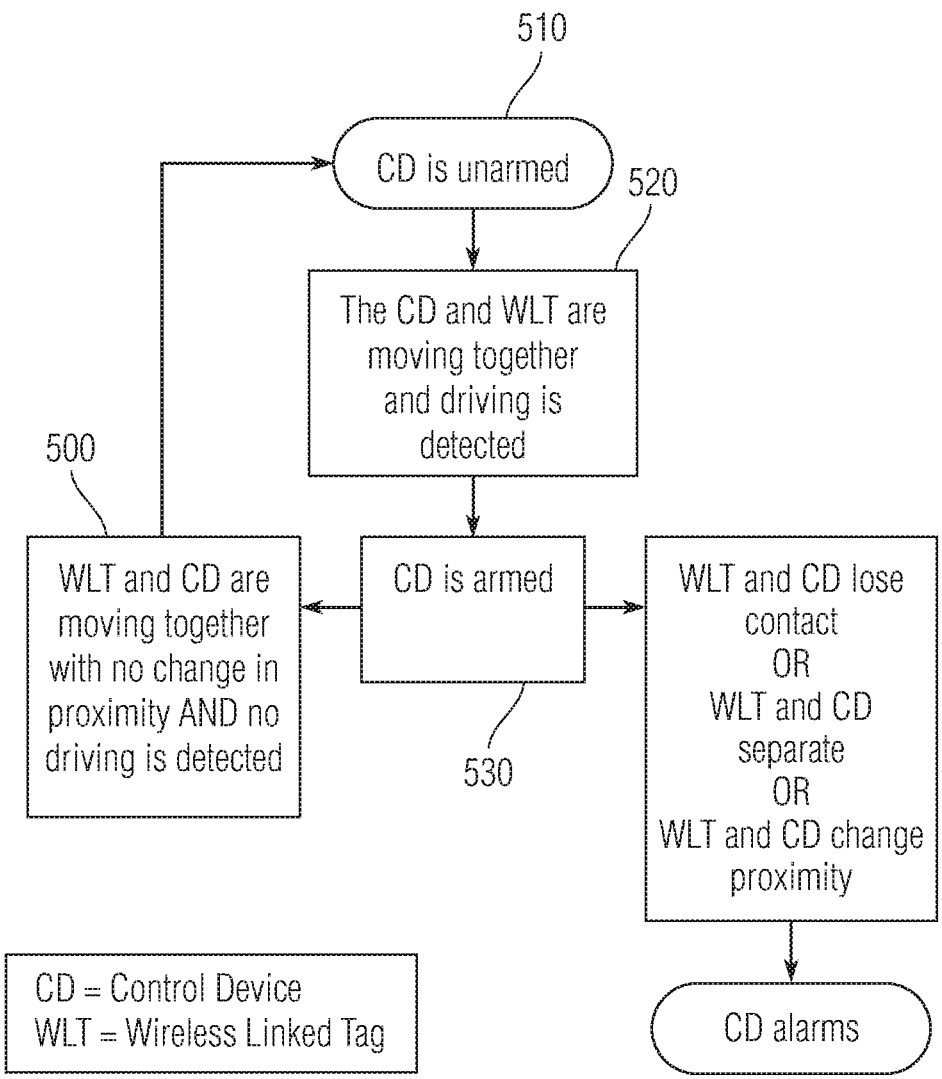
FIG. 7 is a flow diagram illustrating conditions in which an alert system can disarm itself, arm itself, or notify a user.

Referring to FIGS. 6 and 7, the alert system 100 can disarm itself (step 510 of FIG. 7) when the first wireless tag 122 is paired with the control device 160 and the first wireless tag 122 and the control device 160 move together with minimum or no change in proximity. Additionally, the motion sensor 162 does not detect a motion consistent with driving a vehicle (see FIG. 7, step 500).

For the alert system 100 to arm itself (referring to step 530 of FIG. 7), the first wireless tag 122 is paired with the control device 160 and the first wireless tag 122 and the control device 160 move together with minimum or no change in proximity. Additionally, the motion sensor 162 detects a motion consistent with driving a vehicle (see FIG. 7, step 520).

Once the alert system 100 is armed, for the alert system 100 to notify a user of an event, at least one of the following should take place: (i) the first wireless tag 122 and the control device 160 lose communication, (ii) the first wireless tag 122 and the control device 160 separate by a predetermined distance, or (iii) the first wireless tag 122 and the control device 160 change proximity by a pre-determined distance.

In an embodiment of the present invention, the predetermined distance or the distance in which the first wireless tag 122 and the control device 160 lose communication is from about 1 inch or less to about 30 feet or more, such as from about 1 foot to about 20 feet, or from about 10 feet to about 18 feet, or from about 14 feet to about 16 feet, or about an average length of a vehicle.

In one embodiment, the control device 160 can include a program or an application that enables a user to adjust or program a predetermined threshold distance for an event to take place. For example, a user driving a Lexus RX may want to receive a notification if he leaves a child in the car and if he moves more than a vehicle length away from the child. In this case, the user can program the control device to provide him with a notification when he is approximately 15.65 feet (the length of a Lexus RX) away from the vehicle.

Additionally and/or alternatively, the user can program the control device 160 to provide a notification, after the predetermined threshold distance has been reached or passed and after a predetermined time has passes. This embodiment can be particularly helpful to users (e.g., parents or pet owners) who have multiple size vehicles. Additionally, the user 700 can set a predetermined notification time delay. For example, the predetermined notification time delay can be from about 1 second or less to about 10 seconds or more, such as from about 2 seconds to about 9 seconds, or from about 3 seconds to about 8 seconds, or from about 4 seconds to about 7 seconds, or from about 5 seconds to about 6 seconds.

For example, a user 700 can set the predetermined threshold distance to be a length approximately equal to the length of the parent's shortest vehicle. As such, when the user 700 is in his larger vehicle and leaves the vehicle to pick-up his child 200 from the back seat, the distance from the user 700 to the back of the vehicle, where the child 200 is sitting, might be more than the predetermined threshold distance. This would normally cause the alert system 100 to send a notification to the user 700. However, since the user 700 has programmed a predetermined notification time delay of, for example, 5 seconds, the time delay provides the user 700 an opportunity to reduce the distance to a distance shorter than the predetermined threshold distance, thus preventing the notification to be sent by the control device 160. However, if, after the predetermined notification time delay, the distance between the user 700 and the child 200 is not reduced to a distance less than the predetermined threshold distance, then the control device 160 sends a notification to the user 700 that the child 200 is still in the vehicle.

The notification to the user 700 can be in a form of an alarm sound coming from the control device 160, a text message displayed on the display of the control device 160, vibration of the control device 160, and/or a change in the color of the screen of the control device 160. Alternatively or additionally, the notification to the user can be in a form of a vehicle alarm system, vehicle lights, vehicle horn, vehicle emergency lights, vehicle turn signals, a vehicle sound system, or a combination thereof.

Figure 8:
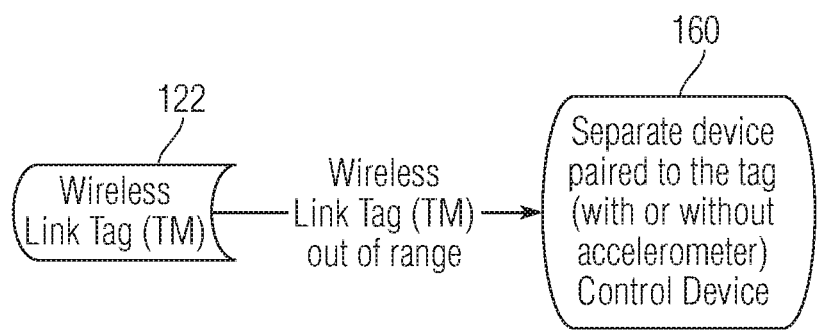
FIG. 8 is a flow diagram illustrating an alert system having only a wireless tag and a control device.

FIG. 8 illustrates an embodiment of the present invention, wherein the alert system only includes the control device 160 and the first wireless tag 122. In this embodiment, the control device 160 and the first wireless tag 122 are not paired together, due to the distance between them. Thus, the alert system is un-armed. When the first wireless tag 122 is placed within a predetermined range, the control device 160 is paired to the first wireless tag 122. When a child or a pet who is wearing the first wireless tag 122 moves a predetermined distance away from the control device 160, the wireless tag 122 and the control device 160 will no longer be paired. As such, the control device 160 will inform the user of the control device 160 that the child, person, or pet wearing the wireless tag 122 is too far away.

Figure 9A:
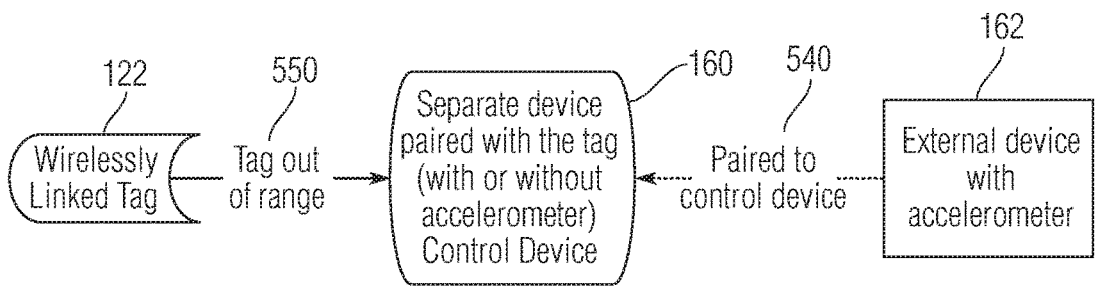
FIG. 9A is a flow diagram illustrating a condition in which an alert system having a motion sensor incorporated into an external device disarms itself.
Figure 9B:
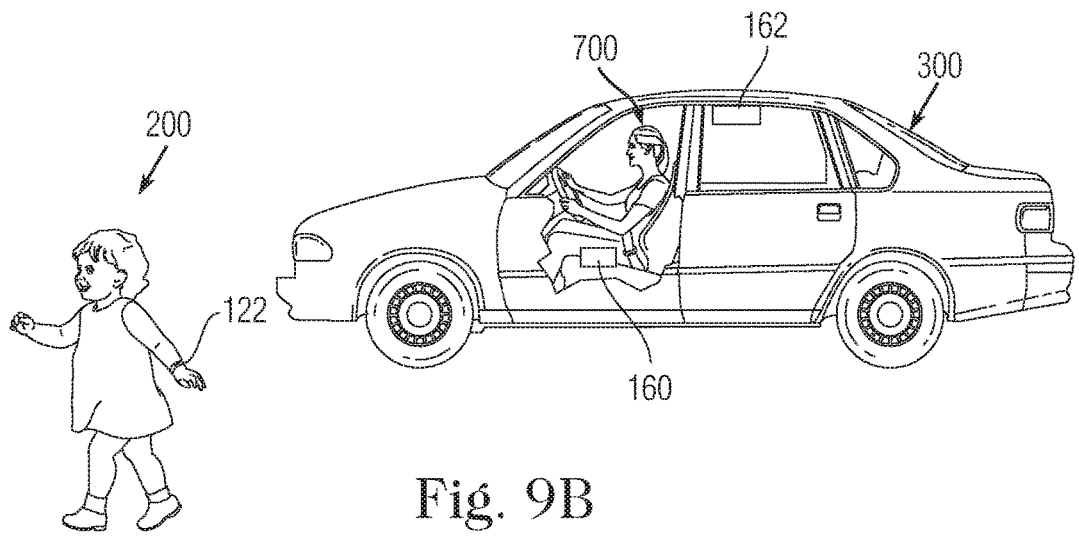
FIG. 9B illustrates the alert system, corresponding to the flow diagram in FIG. 6A, having a motion sensor incorporated into an external device and capable of disarming itself.

As shown in FIG. 9A, the alert system 100 can be disarmed when the external device having the motion sensor 162 is paired to the control device 160 (at step 540) and the first wireless tag 122 is out of range of the control device 160 (at step 550). In the example shown in FIGS. 9A and 9B, a vehicle 300 can include the motion sensor 162 and the child 200 can be wearing the first wireless tag 122. Since the user 700 carrying the control device 160 is in the vehicle 300, the control device 160 pairs with the motion sensor 162 in the vehicle 300. However, since the child 200 wearing the first wireless tag 122 is outside of the vehicle 300 and he is out of range of the control device 160 or is at a distance greater than the predetermined threshold distance from the control device 160, the control device 160 determines that the child 200 is not in danger of being left alone in the vehicle 300. Thus, the alert system 100 disarms itself (i.e., the control device 160 disarms the alert system 100).

Figure 9C:
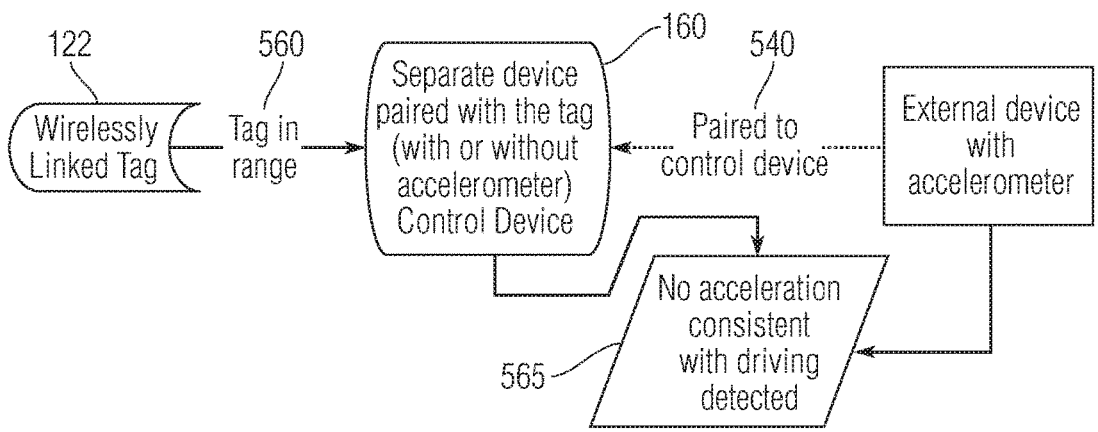
FIG. 9C is a flow diagram illustrating an alternative condition in which an alert system having a motion sensor incorporated into an external device disarms itself.
Figure 9D:
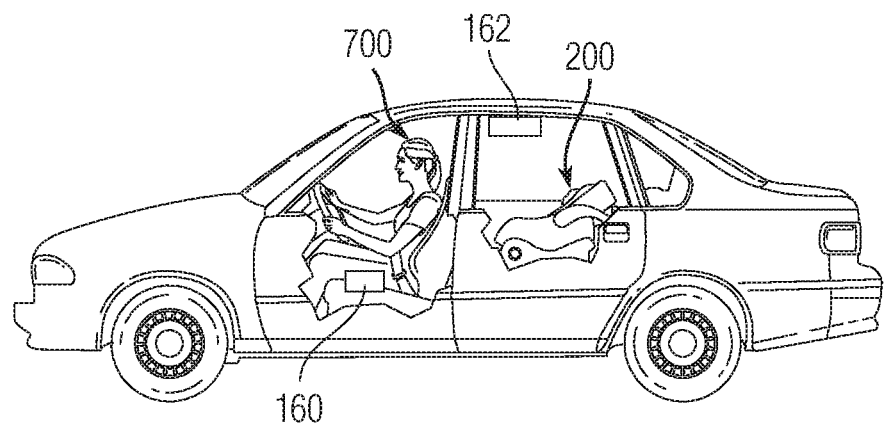
FIG. 9D illustrates the alert system, corresponding to the flow diagram in FIG. 6C, having a motion sensor incorporated into an external device and capable of disarming itself.

In an alternative embodiment, as shown in FIG. 9C, the alert system 100 can disarm itself when the external device having the motion sensor 162 is paired to the control device 160 (at step 540). Additionally, the first wireless tag 122 is in range with the control device 160 (at step 560), such that the first wireless tag 122 is also paired with the control device 160. Furthermore, the motion sensor 162 does not detect a motion consistent with driving a vehicle (at step 565). For example, referring to FIGS. 9C and 9D, the vehicle 300, which is parked, can include the motion sensor 162. The child 200 wearing the first wireless tag 122 and the parent carrying the control device 160 are both in the vehicle 300 having the motion sensor 162. Thus, due to the proximity between the control device 160, the motion sensor 162, and the first wireless tag 122, the control device 160 can be paired with the motion sensor 162 and the first wireless tag 122. Since the vehicle 300 is parked, the motion sensor 162 does not detect a motion consistent with driving a vehicle. As such, the alert system 100 determines that the user 700 carrying the control device 160 and the child 200 wearing the wireless tag 122 are together and that the child 200 is not left behind in the vehicle 300. Thus, the alert system 100 disarms itself.

Figure 9E:
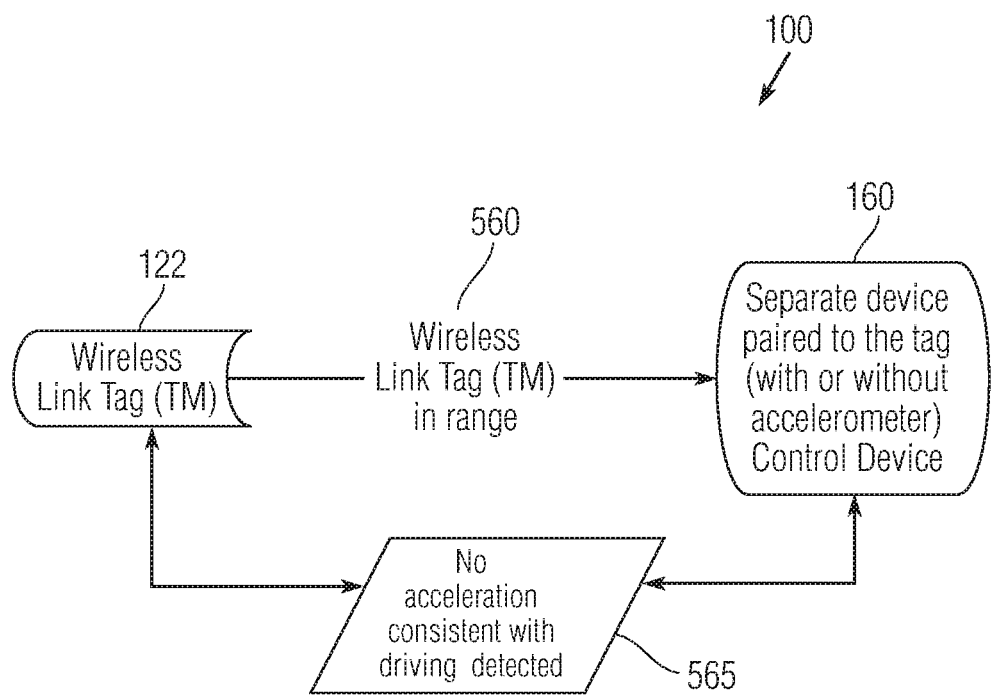
FIG. 9E is a flow diagram illustrating an alternative embodiment of FIG. 9C.

FIG. 9E, illustrates an alternative embodiment in which the alert system 100 does not include an external device with a motion detector. In this exemplary embodiment, the first wireless tag 122 is in range with the control device 160 (at step 560), such that the first wireless tag 122 is also paired with the control device 160. Furthermore, a motion sensor does not detect a motion consistent with driving a vehicle (at step 565). As such, the alert system 100 disarms itself.

Figure 10A:
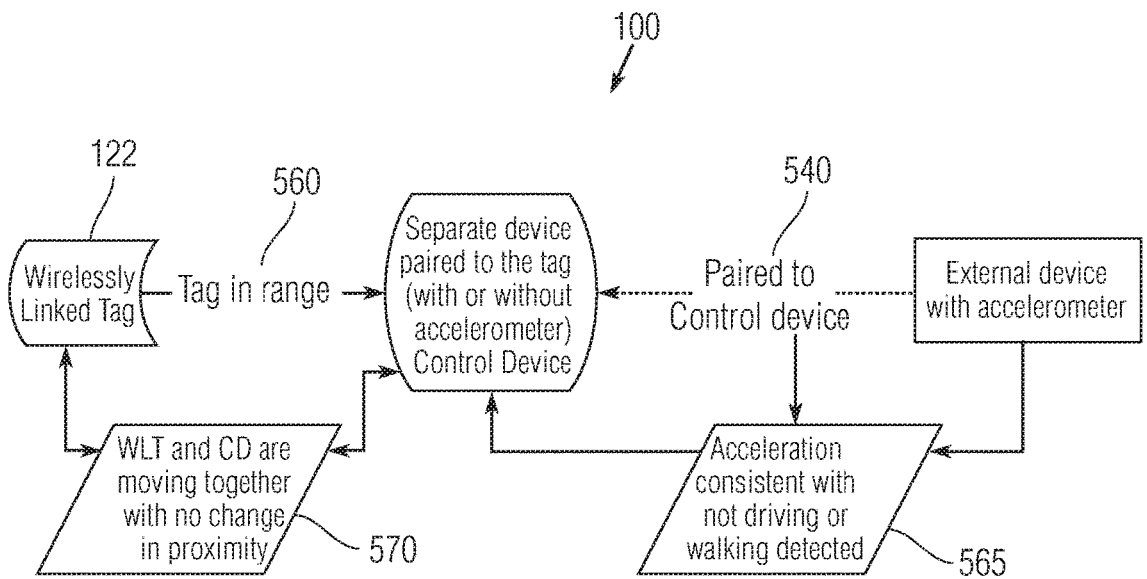
FIG. 10A is a flow diagram illustrating another alternative condition in which an alert system having a motion sensor incorporated into an external device disarms itself.
Figure 10B:
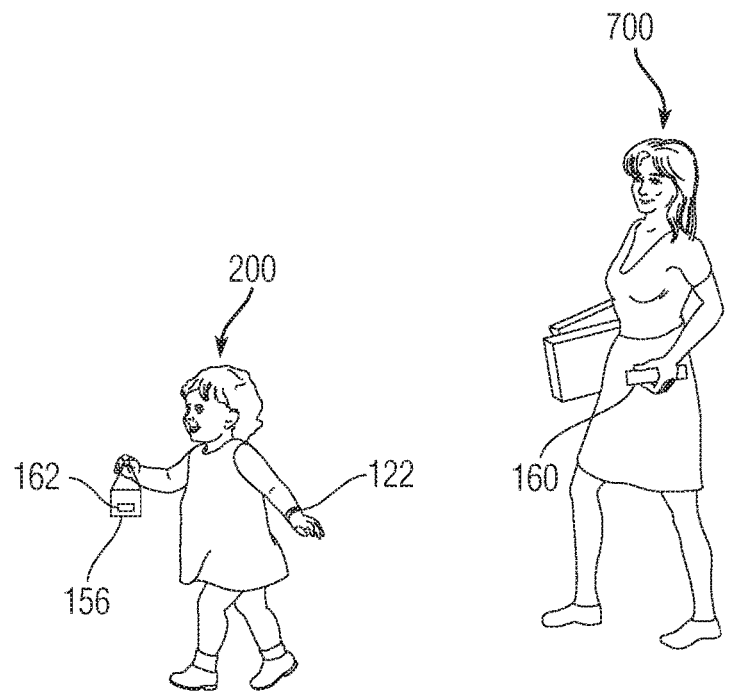
FIG. 10B illustrates the alert system, corresponding to the flow diagram in FIG. 10A, having a motion sensor incorporated into an external device and capable of disarming itself.

As shown in FIG. 10A, the alert system 100 can also disarm itself when the wireless tag 122 is in range of the control device 160 (at step 560), such that the first wireless tag 122 can be paired with the control device 160. Additionally, the control device 160 detects that the first wireless tag 122 and the control device 160 are moving together with minimum or no change in proximity (at step 570). Furthermore, the external device having the motion sensor 162 is paired to the control device 160 (at step 540) and the motion sensor 162 does not detect a motion consistent with driving a vehicle (at step 565). For example, referring to FIGS. 10A and 10B, the user 700 is carrying the control device 160 and the child 200 is wearing the first wireless tag 122 and is also carrying a video game console 156, which includes a motion sensor 162. The user 700 and the child 200 are both walking together. Thus, the first wireless tag 122 and the motion sensor 162 are in the range of the control device 160 and are paired with the control device 160. Moreover, the first wireless tag 122 and the control device 160 move together with minimal or no change in proximity (at step 570). Since the user 700 and the child 200 are walking together, the motion sensor 162 in the video game console 156 does not detect a motion consistent with driving a vehicle (at step 565). Therefore, the control device 160 determines that the child 200 is not in danger of being left alone in the vehicle 300 and the alert system 100 disarms itself.

Figure 10C:
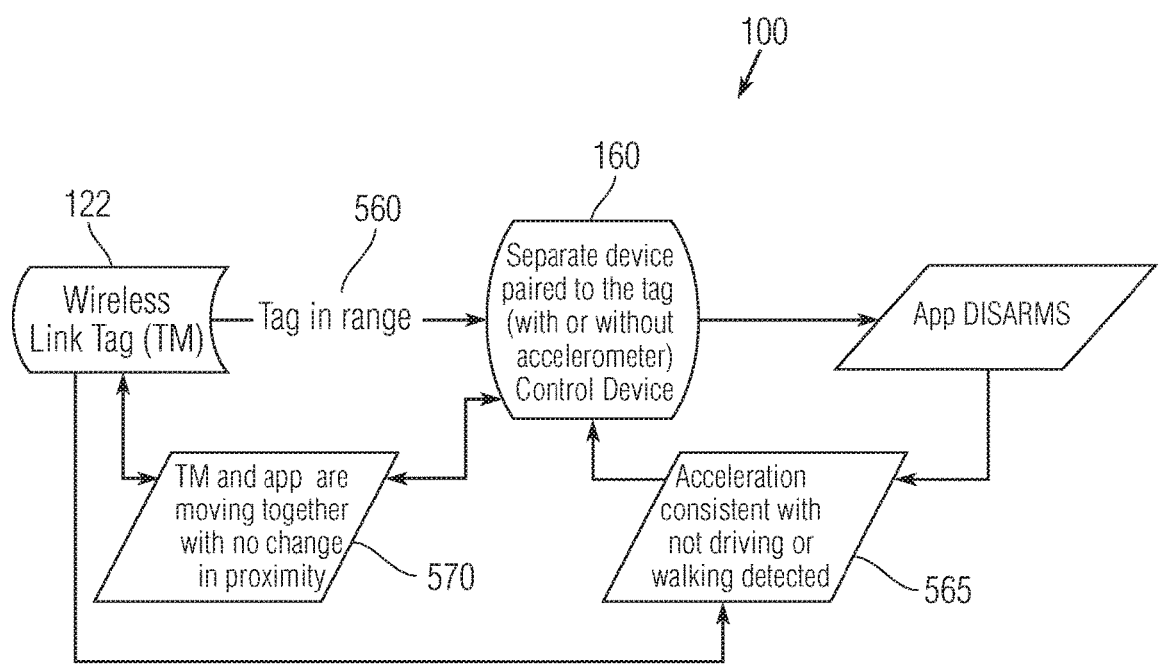
FIG. 10C is a flow diagram illustrating an alternative embodiment of FIG. 10A.

An alternative embodiment of FIG. 10A is shown in FIG. 10C. In FIG. 10C, the alert system 100 can also disarm itself when the wireless tag 122 is in range of the control device 160 (at step 560), such that the first wireless tag 122 can be paired with the control device 160. Additionally, the control device 160 detects that the first wireless tag 122 and the control device 160 are moving together with minimum or no change in proximity (at step 570). Furthermore, a motion sensor does not detect a motion consistent with driving a vehicle (at step 565). Thus, the alert system 100 determines that there is no need to be on alert and the alert system 100 disarms itself.

Figure 11A:
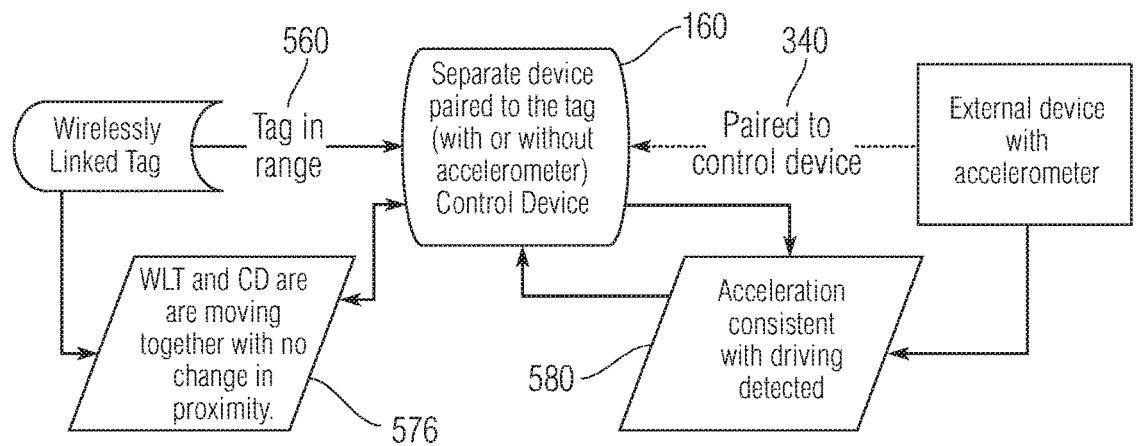
FIG. 11A is a flow diagram illustrating a condition in which an alert system having a motion sensor incorporated into an external device arms itself.

In an embodiment, as shown in FIG. 11A, the alert system 100 can be armed (e.g., it can arm itself) when the first wireless tag 122 is in range of the control device 160 and the two devices are paired to one another (at step 560). Furthermore, for the alert system 100 to be armed, the first wireless tag 122 and the control device 160 may need to move together with minimum or no change in proximity (at step 570). The external device having the motion sensor 162 is also paired with the control device 160 (at step 540) and detects a motion consistent with driving a vehicle (at step 580). For example, referring to FIGS. 11A and 9D, the vehicle 300, which is moving, can include the motion sensor 162. The child 200 wearing the first wireless tag 122 and the user 700 carrying the control device 160 are both in the moving vehicle 300. Thus, the control device 160 can be paired with the motion sensor 162 and the first wireless tag 122. Since the vehicle 300 is in motion, the motion sensor 162 in the vehicle 300 detects a motion consistent with driving a vehicle. Thus, the control device 160 determines that when the vehicle 300 stops, the user 700 can leave the vehicle 300 and accidentally leave the child 200 behind. Accordingly, the alert system 100 arms itself.

Figure 11B:
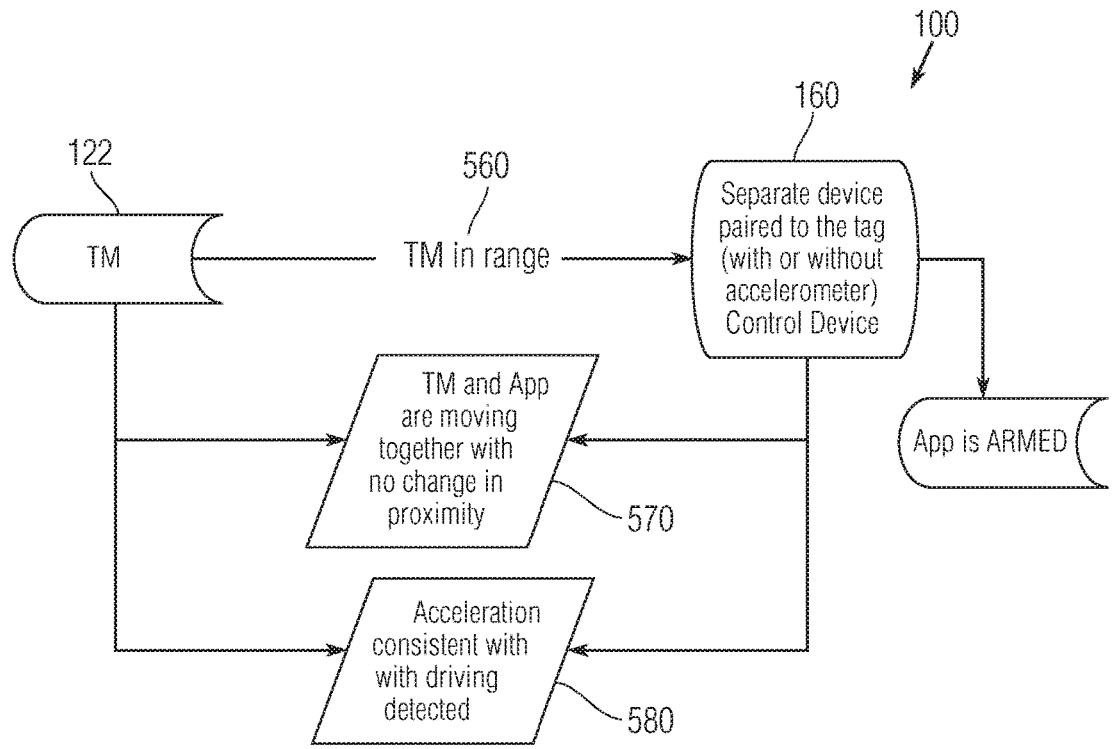
FIG. 11B is a flow diagram illustrating an alternative embodiment of FIG. 11A.

An alternative embodiment of FIG. 11A is illustrated in FIG. 11B, where the alert system 100 can be armed (e.g., it can arm itself) when the first wireless tag 122 is in range of the control device 160 and the two devices are paired to one another (at step 560). Furthermore, for the alert system 100 to be armed, the first wireless tag 122 and the control device 160 may need to move together with minimum or no change in proximity (at step 570). Furthermore a motion consistent with driving a vehicle (at step 580) is detected. Thus, the alert system 100 determines that there is a possibility that a child is in the vehicle and can be left behind once the parents arrive at their destination. Thus, the alert system 100 arms itself.

Figure 12A:
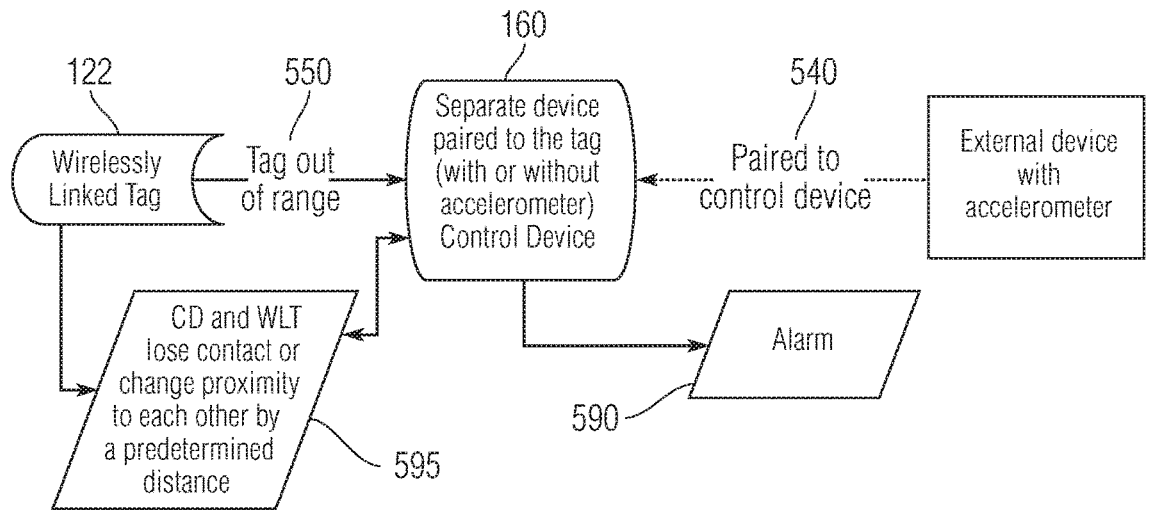
FIG. 12A is a flow diagram illustrating a condition in which an alert system send a notification to a user.
Figure 12B:
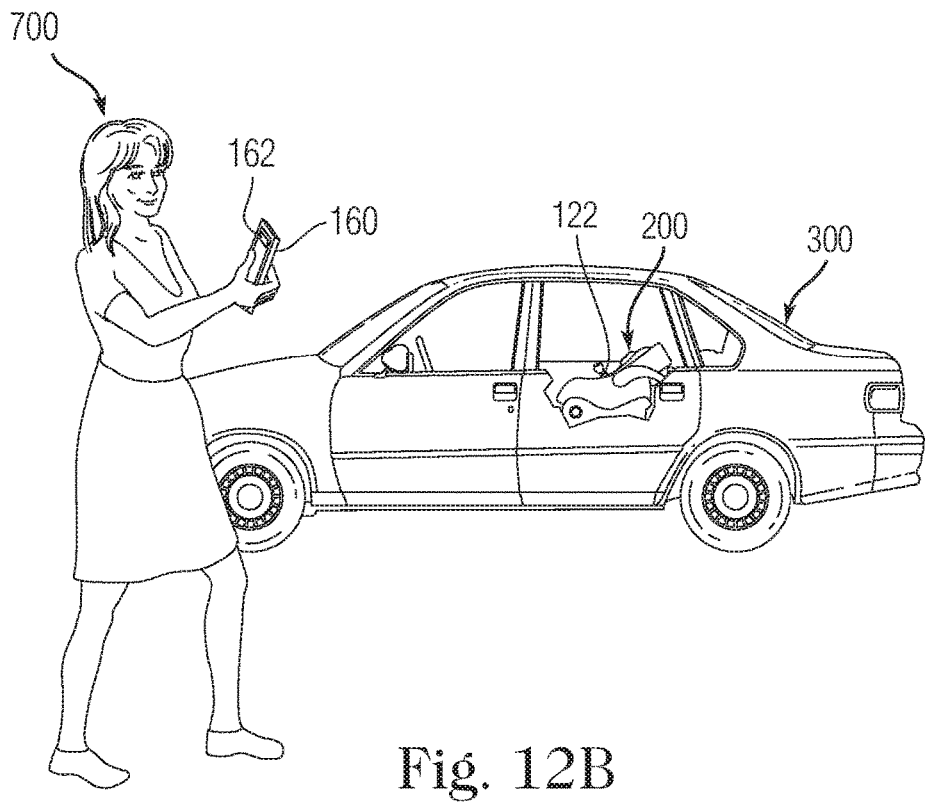
FIG. 12B illustrates the alert system, corresponding to the flow diagram in FIG. 12A, capable of sending a notification to a user.

In an embodiment, as shown in FIG. 12A, the armed alert system 100 can send a notification or an alarm (at step 590) to a user when the motion sensor 162 is paired with the control device 160 (at step 540) and when the first wireless tag 122 is out of range (at step 550), is at a distance greater than the predetermined threshold distance from the control device 160, or there is a change in proximity between the first wireless tag 122 and the control device 160 (at step 595). For example, referring to FIGS. 12A and 12B, after the alert system 100 is armed, the vehicle 300 reaches its destination and is parked. The user 700, carrying the control device 160, leaves the vehicle 300 without taking the child 200 wearing the first wireless tag 122. After the user 700 walks away from the vehicle 300 and is out of range of the first wireless tag 122, the control device 160 will not receive a signal from the first wireless tag 122. Alternatively, if the user 700 is more than a predetermined threshold distance away from the first wireless tag 122, the control device 160 acknowledges that. Furthermore, the motion sensor 162, which is incorporated in the control device 160, as shown in FIG. 12B, will not detect a motion consistent with driving a vehicle. Thus, the control device 160 concludes that the child 200 has been left behind in the vehicle 300 and notifies the user 700.

Figure 12C:
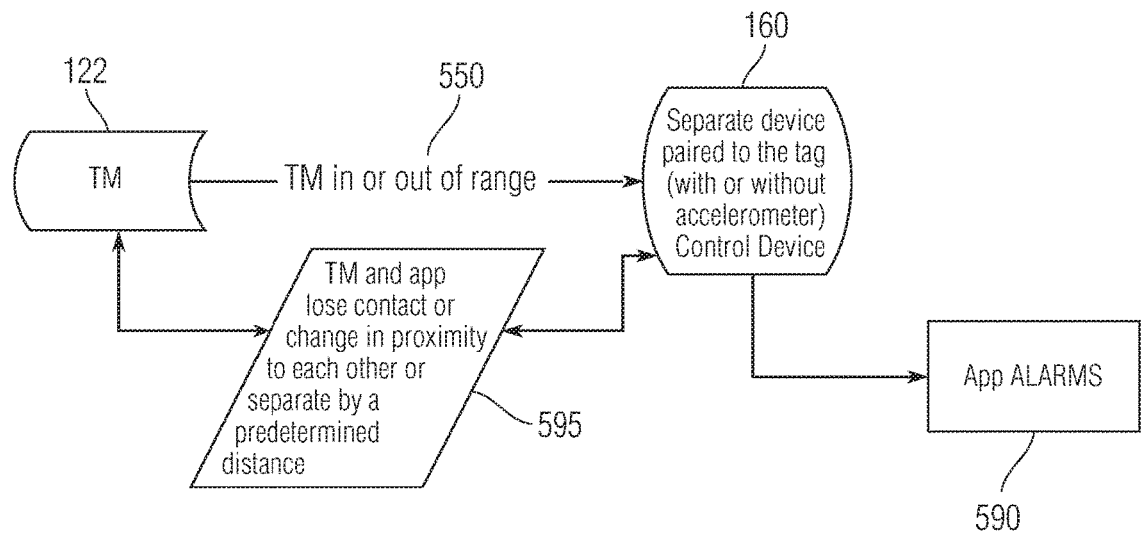
FIG. 12C is a flow diagram illustrating an alternative embodiment of FIG. 12A.

An alternative embodiment of FIG. 12A is illustrated in FIG. 12C. The embodiment, as shown in FIG. 12C, is very similar with the embodiment shown in FIG. 12A, except that this alternative embodiment does not have an external device with accelerometer. Thus, the armed alert system 100 can send a notification or an alarm (at step 590) to a user when the first wireless tag 122 is out of range (at step 550), is at a distance greater than the predetermined threshold distance from the control device 160, or there is a change in proximity between the first wireless tag 122 and the control device 160 (at step 595).

In an alternative example, the motion sensor 162 is incorporated in the vehicle 300. In this alternative example, once the vehicle has stopped, the motion sensor 162 will send a signal to the control device 160 informing it that the motion of the vehicle 300 is no longer consistent with driving a vehicle. When the user 700 leaves the vehicle 300, and the signal between the control device 160 and the first wireless tag 122 is lost or if the control device 160 is at a predetermined threshold distance away from the first wireless tag 122, then the control device 160 concludes that the child 200 has been left behind in the vehicle 300 and notifies the user 700.

In an embodiment, the predetermined threshold distance can be measured by cellular phone towers, GPS, the strength of the signal between the control device 160 and the first wireless tag 122 to name a few. Other methods known to one skilled in the art can also be used to measure the predetermined threshold distance.

In all of the examples above, the notification can be programmed to have a time delay so that the parent has an opportunity to reduce the distance between himself and the child wearing the first wireless tag 122. This is so that if the set threshold distance is short, the control device 160 does not notify the parent in every instance, even in instances in which the parent is trying to go around the vehicle 300 to get the child 200.

Figure 13:
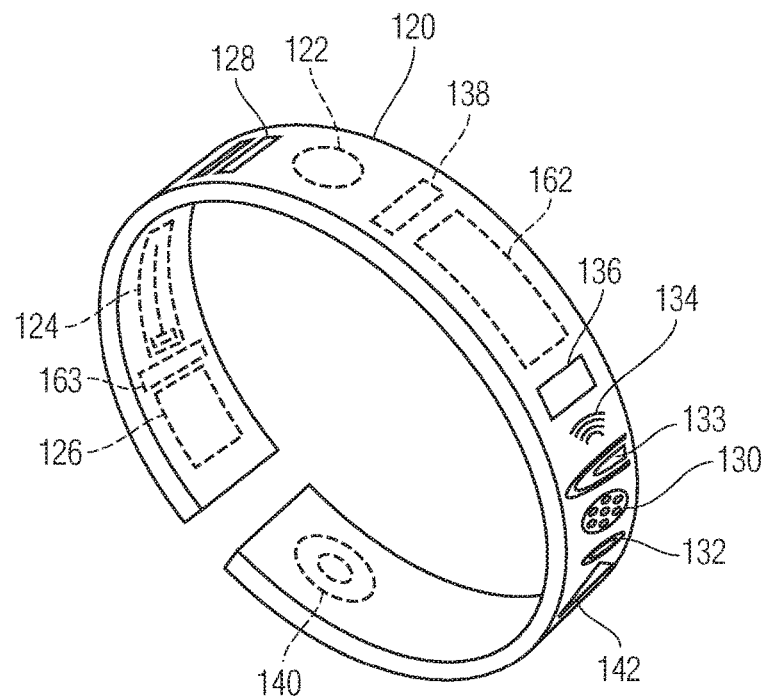
FIG. 13 is a perspective view of a device incorporating a plurality of sensors.

In an exemplary embodiment, as shown in FIG. 13, the wireless tag 122 can be incorporated or secured to a device 120. The device 120 can be a bracelet-like item that can incorporate other sensors to measure different environmental factors. An exemplary set of sensors that can be incorporated into or attached to the device 120 include, but are not limited to, a temperature sensor 124, a moisture sensor 126, a noise sensor 128, an odor sensor 130, a smoke sensor 132, a CO sensor 133, a $CO_2$ sensor 134, a light sensor 136, a vibration sensor 138, a pressure sensor 140, a chemical sensor 142, such as an air quality sensor, including but not limited to ozone and UV radiation, and a GPS 163. Each of these sensors can include a threshold. When the level of each of the environmental factors passes or reaches the set threshold level, the wireless tag 122 can send a signal to the control device 160 so that it can alert a user of a possible danger corresponding to one or more of the environmental factors. In this particular embodiment, the device 120 can include a processor to distinguish different environmental factors and send a different signal to the control device 160 depending on the environmental factor that has passed its set threshold level. Additionally, the device 120 can include the motion sensor 162 instead of the control device 160. In one example, the user can set the threshold level for each of the environmental factors. Alternatively, the threshold level for each of the environmental factors is preset by the manufacturer.

In an embodiment, as shown in FIGS. 14 and 15, the alert system 100 can include at least a second wireless tag 152 that is capable of being paired with the control device 160. The second wireless tag 152 can be incorporated into, secured to, or removably secured to a device/item 150. The item 150 can be any item that a user carries every day. Some examples of item 150 can be a key fob, a watch (mechanical watch and/or electronic/computer-based watch), a wallet, a purse, a belt, a pair of shoes, or a pair of eye glasses. In one example, as shown in FIG. 14, the motion sensor 162 can be incorporated into the control device 160 and the second wireless tag 152 can be incorporated into a key fob. Alternatively, the motion sensor 162 can be incorporated into the vehicle 300.

In another example, as shown in FIG. 15, the motion sensor 162 can be incorporated into a control device 160 in the vehicle 300 and the second wireless tag 152 can be incorporated into a key fob. The motion sensor 162 can also be paired with the control device 160 to provide the control device 160 information about different types of movements, such as a motion consistent with driving a vehicle.

Figure 16:
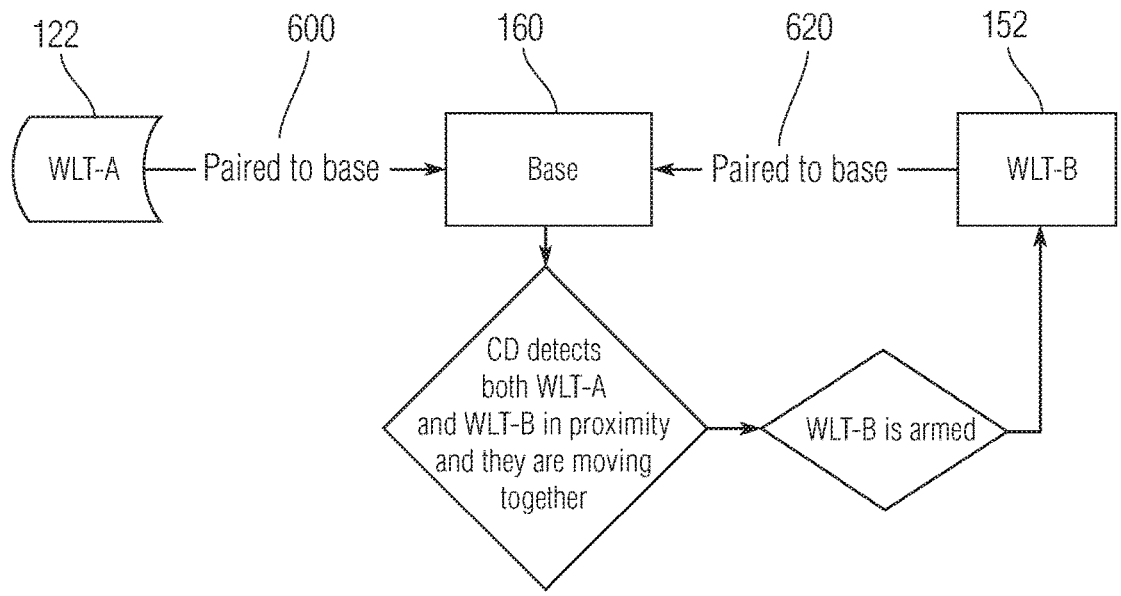
FIG. 16 is a flow diagram illustrating a condition in which an alert system having a first wireless tag and a second wireless tag arms itself.

In action, as shown in FIG. 16, the alert system 100 arms itself when (i) the first wireless tag 122 worn by the child 200 and the second wireless tag 152 incorporated into the item 150 (e.g., a key fob) are paired with the control device 160 (at steps 600 and 620, respectively) and (ii) the control device 160 detects that the first wireless tag 122 and the second wireless tag 152 move together and in proximity to each other. For example, as shown in FIG. 15, the child 200 wearing the first wireless tag 122 is in the moving vehicle 300. Additionally, the second wireless tag 152 can be secured to an item 150, such as the key fob, which is also in the moving vehicle 300. The motion sensor 162, which is incorporated into the control device 160 of the vehicle 300, can detect a motion consistent with driving a vehicle. Additionally, the first wireless tag 122 and the second wireless tag 152 are both paired with the control device 160. Thus, when the first wireless tag 122 and the second wireless tag 152 are moving together and in proximity to each other, the control device 160 can conclude that the vehicle 300 is moving and once it stops, the parent could accidentally leave the child 200 in the vehicle. As such the alert system 100 arms itself.

Figure 17:
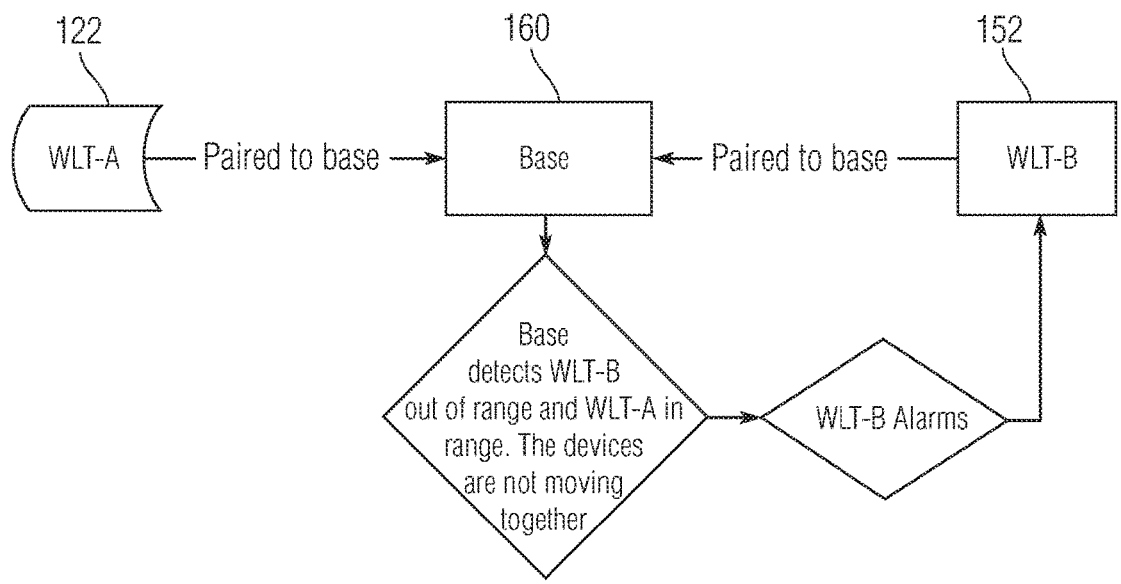
FIG. 17 is a flow diagram illustrating a condition in which an alert system having a first wireless tag and a second wireless tag sends a notification to a user.

Referring to FIG. 17, the alert system 100 can send a notification to a user when the armed alert system 100 detects one or more of the following scenarios: (i) that the second wireless tag 152 is out of range of the control device 160, (ii) the second wireless tag 152 is at a predetermined threshold distance away from the control device 160, or (iii) that the first wireless tag 122 and the second wireless tag 152 are not moving together. For example, referring to FIG. 14, when the user 700 reaches his destination, the user 700 turns off the vehicle 300 and leaves the vehicle 300 with his key fob having the second wireless tag 152. If the user 700 forgets the child 200 in the vehicle, once the user 700 is at a predetermined threshold distance away from the vehicle 300, the control device 160 can alert the user 700 that the child 200 is still in the vehicle. Additionally, if the child 200 climbs out of the stopped vehicle 300, so that the distance between the user 700 and the child 200 is at the predetermined threshold distance, the control device 160 can alert the user 700 that the child 200 needs to be attended to, is out of line-of-sight, or is too far from the user 700. For example, the control device 160 can alert or notify the user 700 about leaving the child 200 behind by sounding the vehicle horn, vibrating the key fob, or any other ways, such as flashing the lights.

Figure 18A:
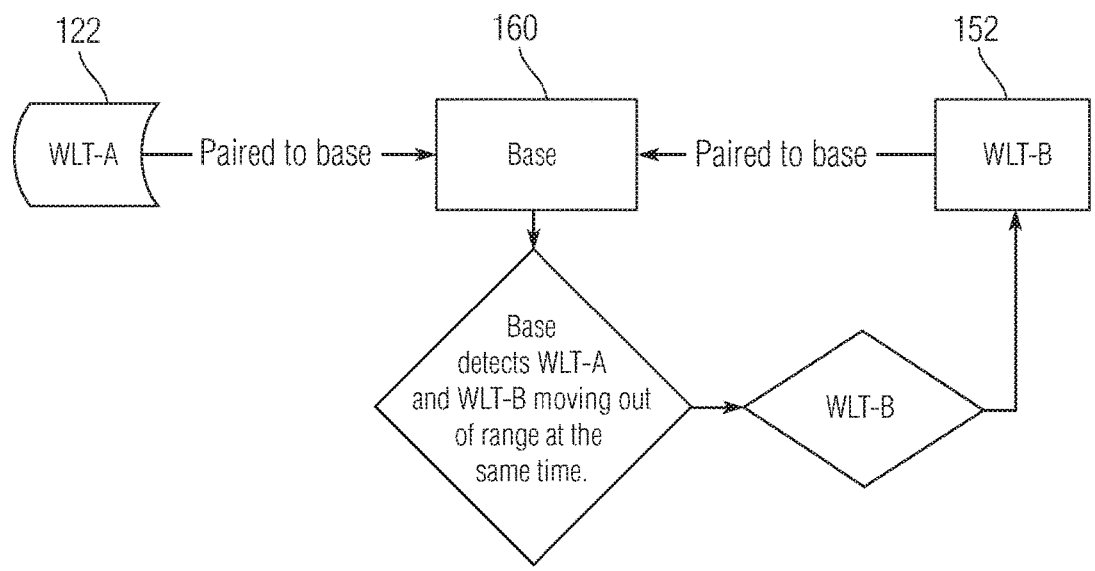
FIG. 18A is a flow diagram illustrating a condition in which an alert system having a first wireless tag and a second wireless tag disarms itself.
Figure 18B:
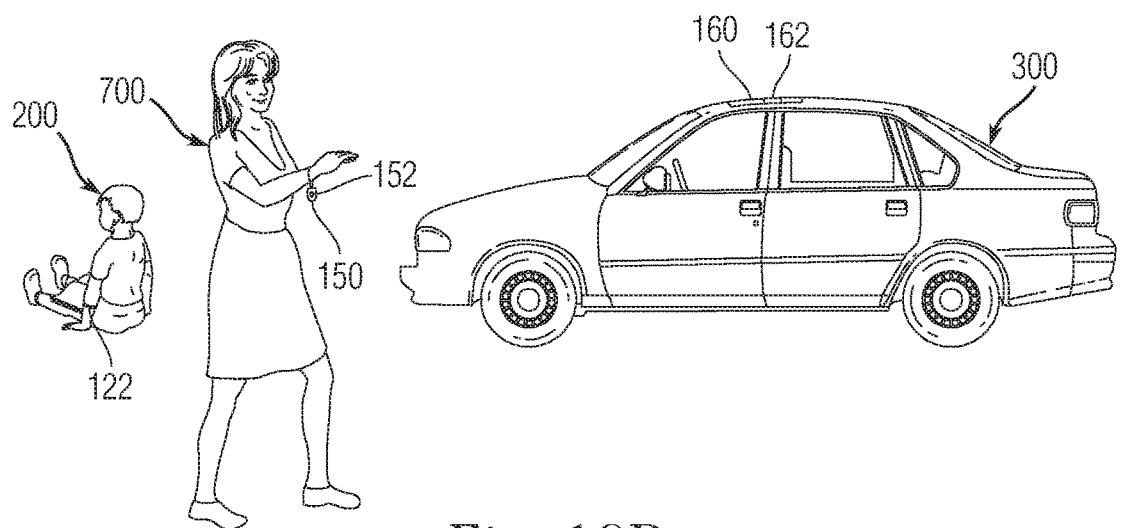
FIG. 18B illustrates the alert system, corresponding to the flow diagram in FIG. 18A, capable of disarming itself.

In an embodiment, as shown in FIG. 18A, the alert system 100 can be disarmed or can disarm itself when the first wireless tag 122 and the second wireless tag 152 move out of range or move a predetermined threshold distance away from the control device 160 of the vehicle 300. The first wireless tag 122 and the second wireless tag 152 can move away from the control device 160 at different times or at the same time. For example, as shown in FIG. 18B, when the vehicle 300 reaches its destination, the user 700 turns off the vehicle 300. At this time, the motion sensor 162 determines that the motion is no longer consistent with a driving a vehicle. The motion sensor 162 can forward this information to the control device 160. The user 700 then takes the key fob having the second wireless tag 152 and the child 200 wearing the first wireless tag 122. Once the key fob having the second wireless tag 152 and the child 200 wearing the first wireless tag 122 are at a predetermined threshold distance away from the control device 160 located in the vehicle 300, the control device 160 concludes that the child 200 is not in the vehicle 300 and that there is no danger of the user 700 leaving the child 200 behind in the vehicle 300. Therefore, the alert system 100 disarms itself.

Figure 19A:
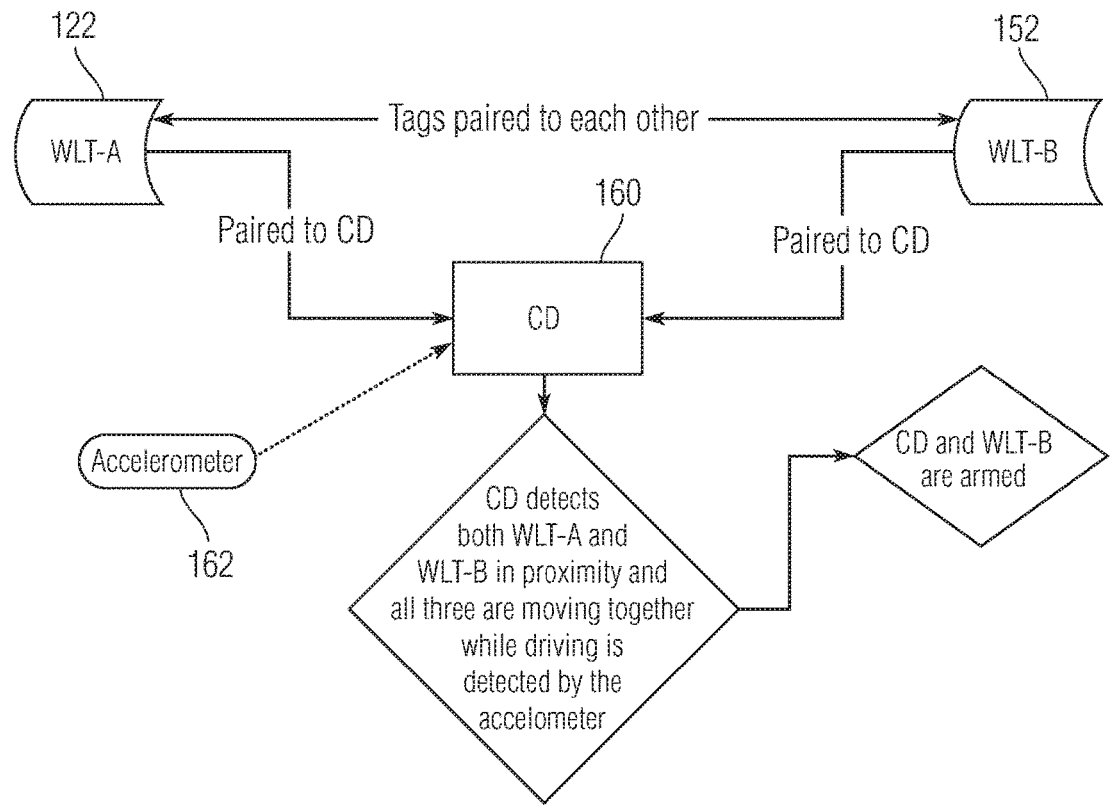
FIG. 19A is a flow diagram illustrating an alternative condition in which an alert system having a first wireless tag and a second wireless tag arms itself.

In an embodiment, as shown in FIG. 19A, the alert system 100 can be armed when the control device 160 is paired to the first wireless tag 122 and the second wireless tag 152. Furthermore, for the alert system 100 to be armed, the control device 160, the first wireless tag 122, and the second wireless tag 152 need to move together and in proximity to each other. Furthermore, for the alert system 100 to be armed, the motion sensor 162 needs to detect a movement in a manner consistent with driving a vehicle. The motion sensor 162 can be incorporated into the control device 160, can be incorporated into a device retaining the first wireless tag 122, or can be incorporated into a device retaining the second wireless tag 152, such as a key fob. In one example, the first wireless tag 122 and the second wireless tag 152 can be paired to one another.

Figure 19B:
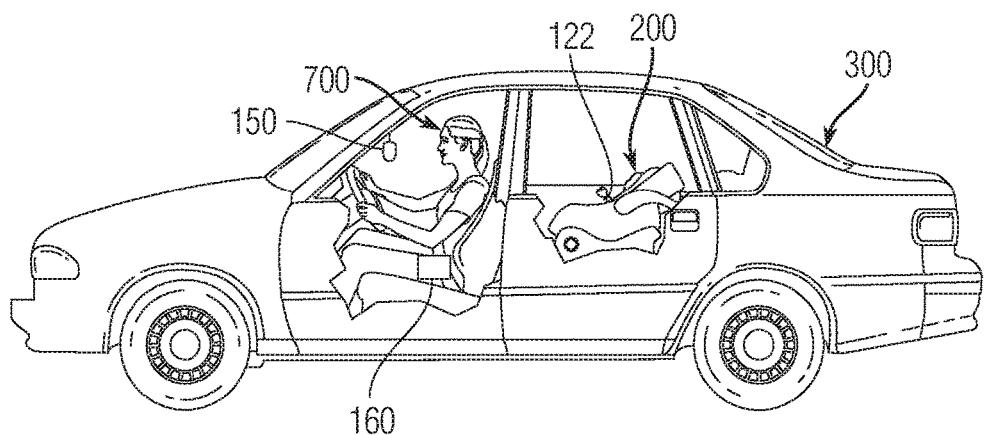
FIG. 19B illustrates the alert system, corresponding to the flow diagram in FIG. 19A, having a first wireless tag, a second wireless tag, and capable of arming itself.

For example, as shown in FIG. 19B, the child 200 wearing the first wireless tag 122 is in the vehicle 300. Additionally, the second wireless tag 152 can be secured to an item 150, such as the key fob, which is also in the vehicle 300. Furthermore, the motion sensor 162 is incorporated into the control device 160, which may be a smart phone. In this example, the first wireless tag 122 worn by the child 200 and the second wireless tag 152 incorporated into a key fob are both paired to the control device 160. Thus, when the vehicle 300 is moving (the movement of the vehicle can be detected by the motion sensor 162) and the first wireless tag 122, the second wireless tag 152, and the control device 160 are all moving together and in proximity to each other, the control device 160 can conclude that the vehicle 300 is moving and once it stops, the user 700 could accidentally leave the child 200 in the vehicle 300. As such, the alert system 100 arms itself.

Figure 20A:
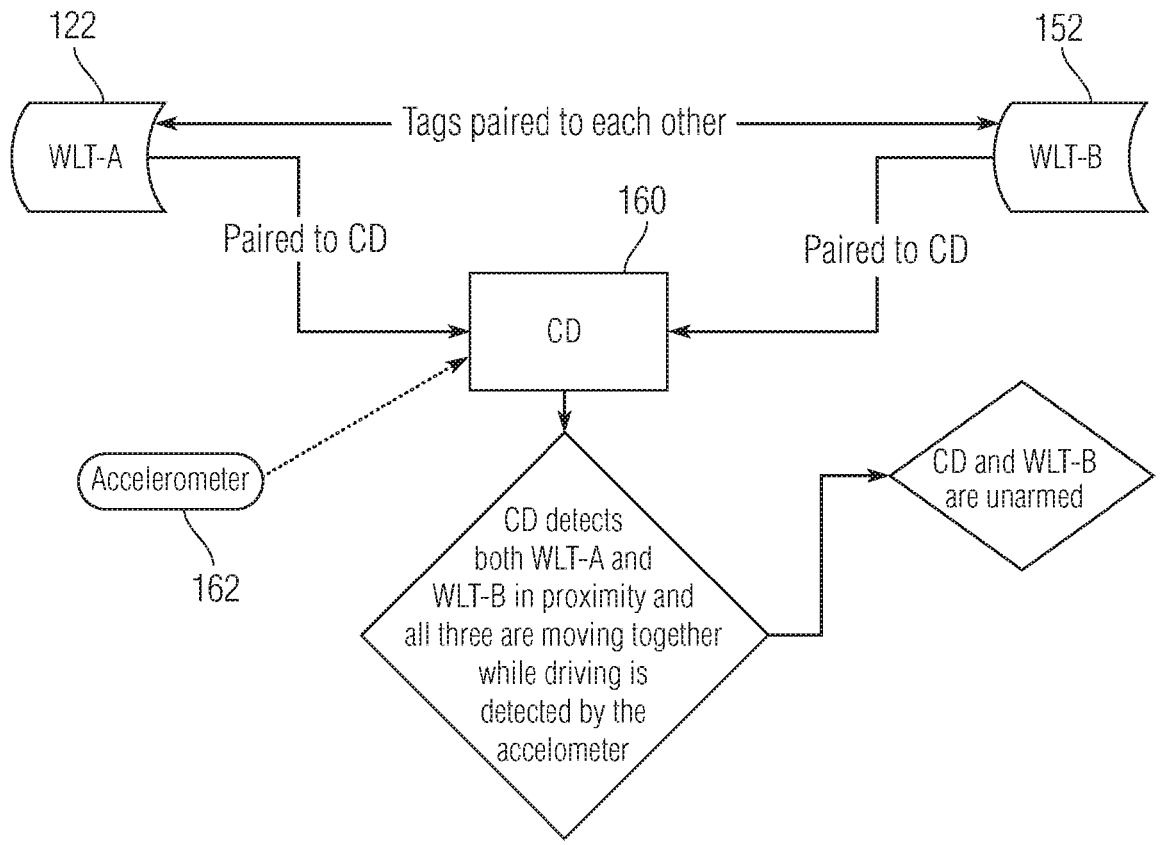
FIG. 20A is a flow diagram illustrating an alternative condition in which an alert system having a first wireless tag and a second wireless tag disarms itself.

In an embodiment, as shown in FIG. 20A, the alert system 100 can disarm itself when the control device 160 is paired to the first wireless tag 122 and the second wireless tag 152. Furthermore, for the alert system 100 to disarm itself, the control device 160, the first wireless tag 122, and the second wireless tag 152 move together and in proximity to each other. Furthermore, for the alert system 100 to disarm itself, the motion sensor 162 detects a movement in a manner not consistent with driving a vehicle. The motion sensor 162 can be incorporated into the control device 160, can be incorporated into a device retaining the first wireless tag 122, or can be incorporated into a device retaining the second wireless tag 152, such as a key fob. In one example, the first wireless tag 122 and the second wireless tag 152 can be paired to one another.

Figure 20B:
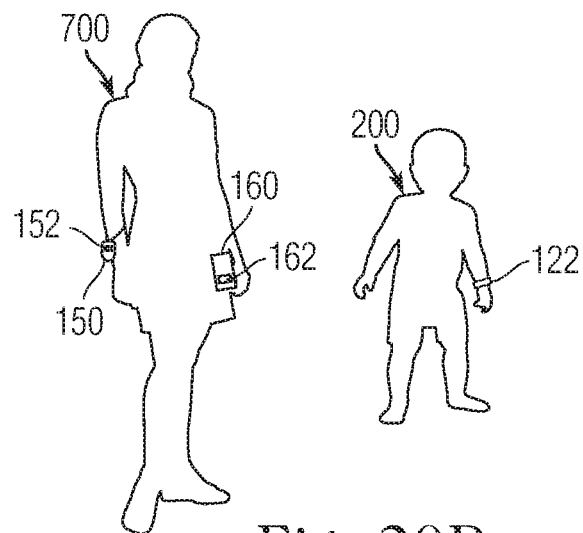
FIG. 20B illustrates the alert system, corresponding to the flow diagram in FIG. 20A, having a first wireless tag, a second wireless tag, and capable of disarming itself.

In one example, as shown in FIG. 20B, the parent and the child 200 have left the vehicle and are walking. The parent carries the control device 160 (e.g. a smart phone) having the motion sensor 162 and the item 150 (e.g. a key fob) having the second wireless sensor 152. The child 200 wears the first wireless sensor 122. The motion sensor 162 incorporated in the control device 160 detects that the movement is not consistent with driving a vehicle. Thus, the control device 160 determines that the child 200 is not in the vehicle 300. Therefore, the child 200 is not in danger of being left behind in the car. Accordingly, the alert system 100 disarms itself.

Figure 21A:
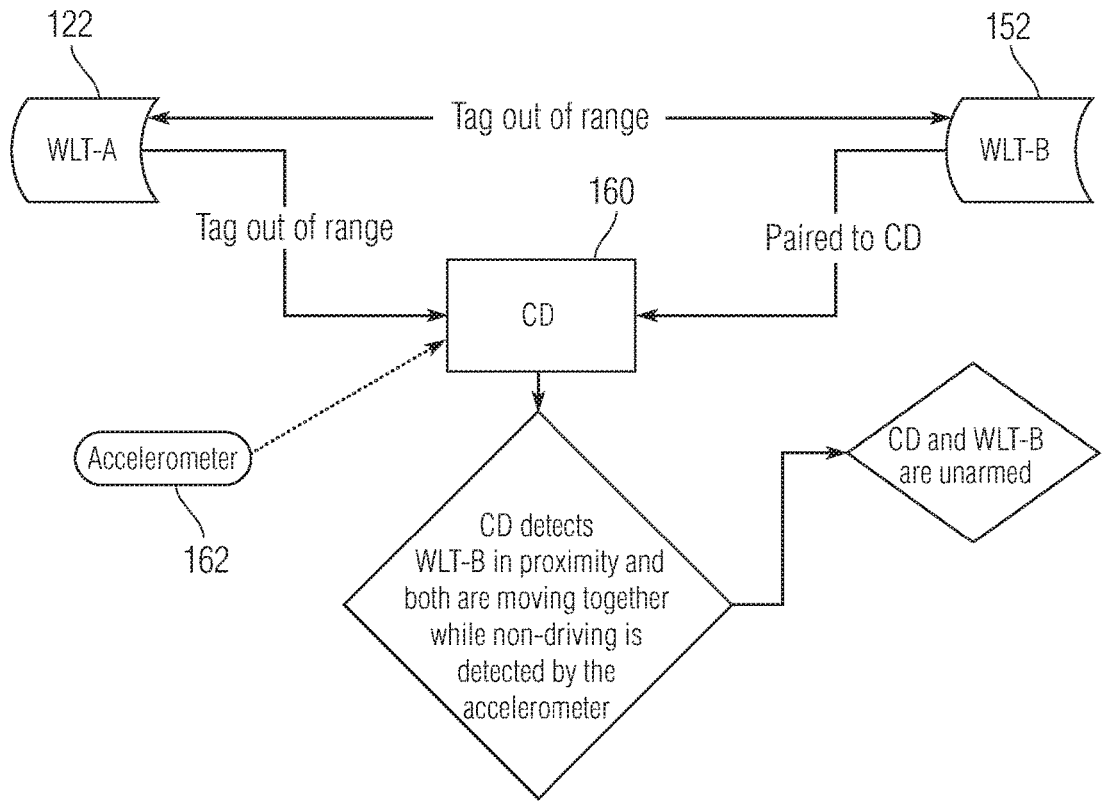
FIG. 21A is a flow diagram illustrating another alternative condition in which an alert system having a first wireless tag and a second wireless tag disarms itself.
Figure 21B:
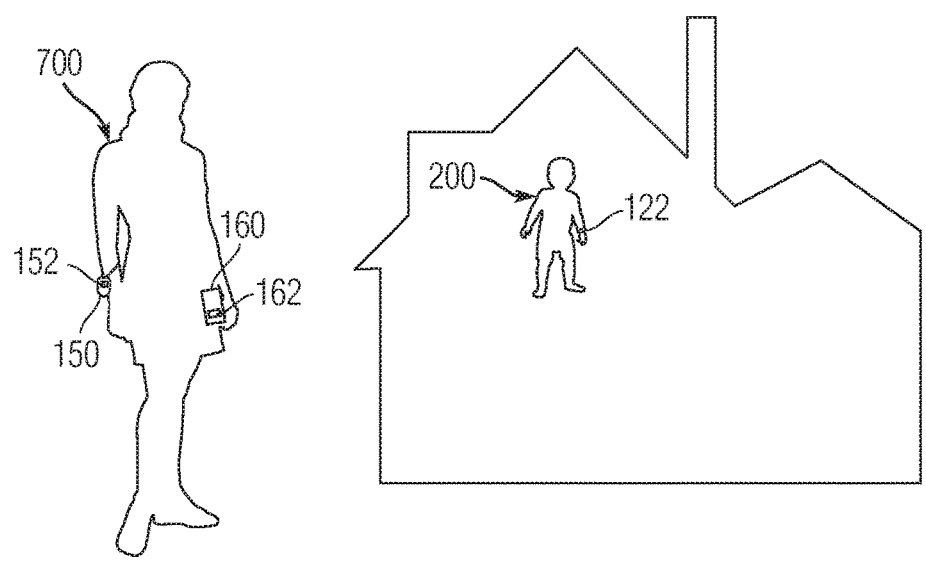
FIG. 21B illustrates the alert system, corresponding to the flow diagram in FIG. 21A, having a first wireless tag, a second wireless tag, and capable of disarming itself.

In an embodiment, as shown in FIG. 21A, the alert system 100 can disarm itself when the control device 160 is paired to the second wireless tag 152 and the control device 160 and the second wireless tag 152 move together and in proximity to each other. Additionally, for the alert system 100 to disarm itself, the motion sensor 162 should detect a movement in a manner not consistent with driving a vehicle. For example, as shown in 21B, the child 200 wearing the first wireless tag 122 is at home. The user 700 is heading toward a vehicle and is carrying the control device 160 (e.g., a smart phone) that includes the motion sensor 162. Additionally the user 700 has his key fob, which includes the second wireless tag 152. Since the user 700 is carrying both the key fob having the second wireless tag 152 and the control device 160, the control device 160 detects that it is moving with the second wireless tag 152. Additionally, the motion sensor 162 in the control device 160 detects a movement in a manner not consistent with driving a vehicle. Thus, the control device 160 determines that the child 200 is not with the user 700 and not in a vehicle and thus there is no danger of the child 200 being left behind in the vehicle 300. As such, the alert system 100 disarms itself.

Figure 22A:
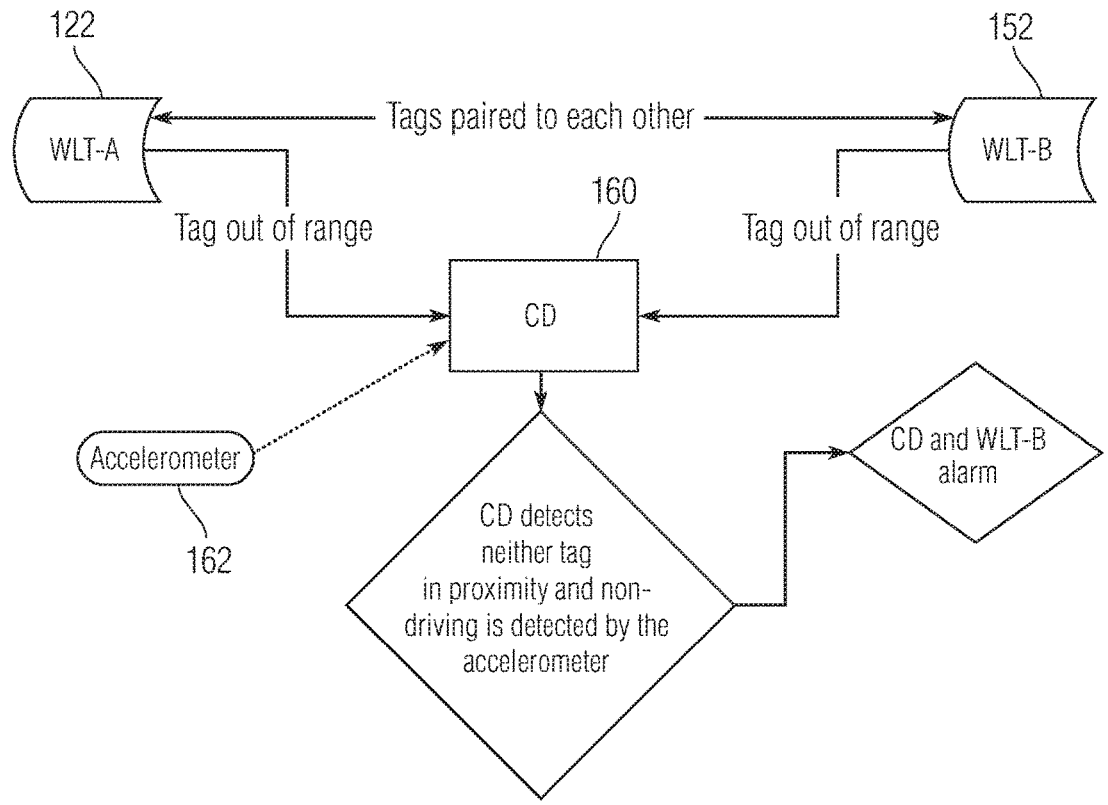
FIG. 22A is a flow diagram illustrating an alternative condition in which an alert system having a first wireless tag and a second wireless tag sends a notification to a user.
Figure 22B:
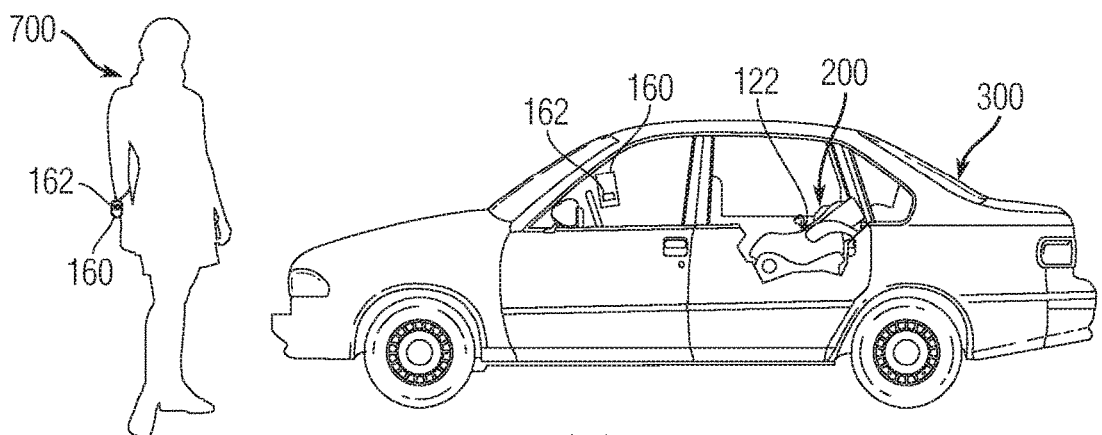
FIG. 22B illustrates the alert system, corresponding to the flow diagram in FIG. 22A, having a first wireless tag, a second wireless tag, and capable of sending a notification to a user.

In an embodiment, as shown in FIG. 22A, an armed alert system 100 can send a notification to a user when the control device 160 is not paired with the first wireless tag 122 or the second wireless tag 152. Additionally, for the armed alert system 100 to send a notification to the user, the motion sensor 162 should not detect a movement in a manner consistent with driving a vehicle. For example, as shown in FIG. 22B, when the vehicle 300 reaches its destination, the user 700 carrying the control device 160 having the motion sensor 162 leaves the vehicle 300. However, the user 700 forgets the key fob having the second wireless tag 152 and the child 200 wearing the first wireless tag 122. In this example, as the user 700 is walking away from the vehicle 300, the motion sensor 162 can detect that the motion is not consistent with driving a vehicle. Moreover, after walking such that the control device 160 is out of range from the first wireless tag 122 and the second wireless tag 152, the control device 160 will no longer be able to receive a signal from the first wireless tag 122 and the second wireless tag 152. Alternatively, after walking a predetermined threshold distance away from the first wireless tag 122 and the second wireless tag 152, the control device 160 acknowledges that it has reached or passed the predetermined threshold distance. As such, the control device 160 concludes that the user 700 has left the child 200 wearing the first wireless tag 122 and the key fob having the second wireless tag 152 in the vehicle 300. Accordingly, the control device 160 sends a notification to the user 700 that the child 200 is still in the vehicle 300. Such a notification can be in a form of one or more of a text, a ring, and/or a flashing screen, a sound from the vehicle horn, or flashing vehicle lights, to name a few.

Figure 23A:
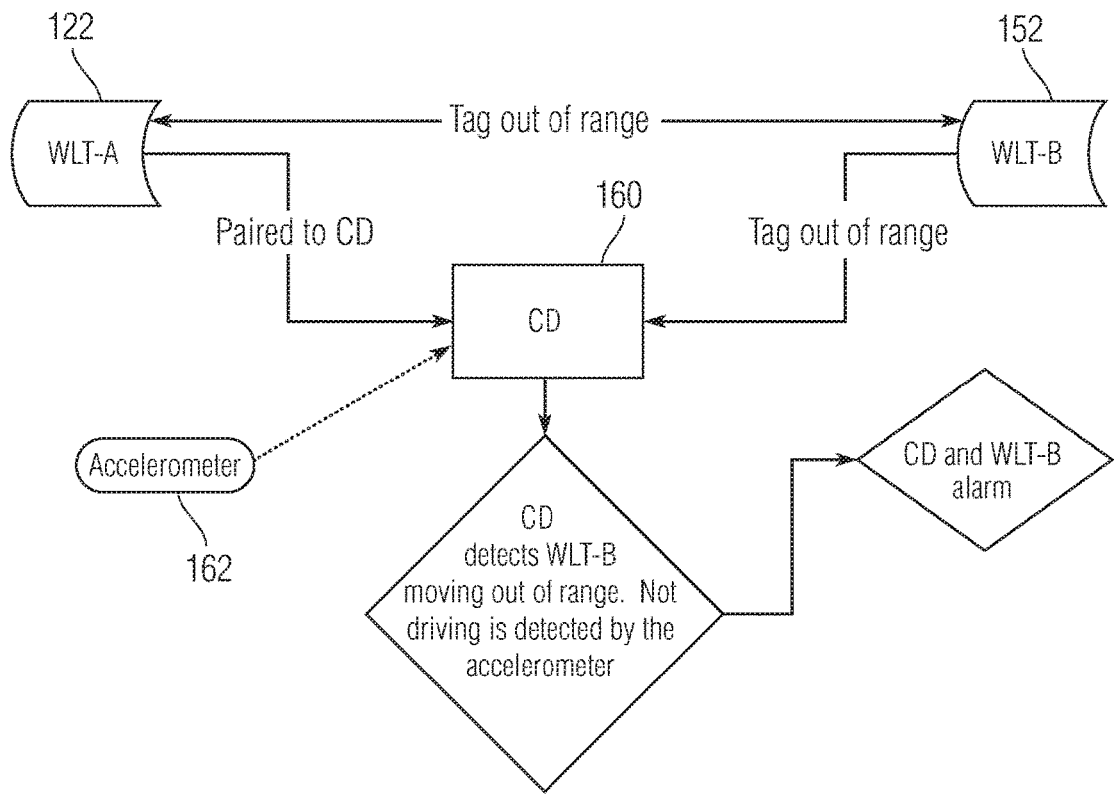
FIG. 23A is a flow diagram illustrating another alternative condition in which an alert system having a first wireless tag and a second wireless tag sends a notification to a user.
Figure 23B:
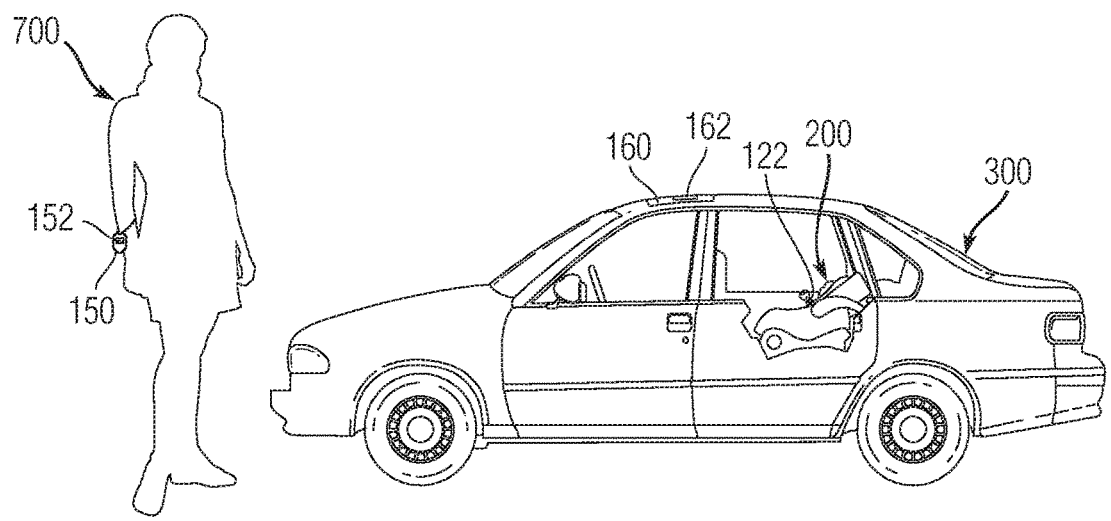
FIG. 23B illustrates the alert system, corresponding to the flow diagram in FIG. 23A, having a first wireless tag, a second wireless tag, and capable of sending a notification to a user.

In an embodiment, as shown in FIG. 23A, for the armed alert system 100 to send a notification to a user, the control device 160 detects that the second wireless tag 152 is moving out of range or that the distance between the control device 160 and the second wireless tag 152 is greater than the predetermined threshold distance. Furthermore, the motion sensor 162 detects a movement in a manner not consistent with driving a vehicle. For example, as shown in FIG. 23B, the control device 160 having the motion sensor 162 can be secured or incorporated into the vehicle 300. When the vehicle 300 reaches its destination, the motion sensor 162 in the vehicle 300 determines that the movement is in a manner not consistent with driving a vehicle. The user 700 then turns off the vehicle 300 and takes the item 150 (e.g., key fob) having the second wireless tag 152 and leaves the vehicle 300 without taking the child 200. After the user 700 is at a predetermined threshold distance away from the vehicle 300, the control device 160 acknowledges that the predetermined threshold distance has been reached. As such, the control device 160 determines that the child is still in the vehicle 300 and that the user 700 has forgotten about the child 200. Alternatively, after the user 700 has moved away from the vehicle 300, the control device 160 in the vehicle 300 loses communication with the second wireless tag 152. As such, since the control device 160 is still paired with the first wireless tag 122, it determines that the child 200 is still in the vehicle 300 and that the user 700 as forgotten about the child 200. Accordingly, the control device 160 notifies the user 700 that the child 200 is left behind in the vehicle 300. Given that, in this exemplary embodiment, the user 700 is only carrying the key fob having the second wireless tag 152, the notification can be in a form of the sound coming out of the vehicle horn, the vehicle lights flashing, or both. Alternatively, the key fob may include a speaker, an LED, or a vibration generator to alert the user 700.

Figure 24:
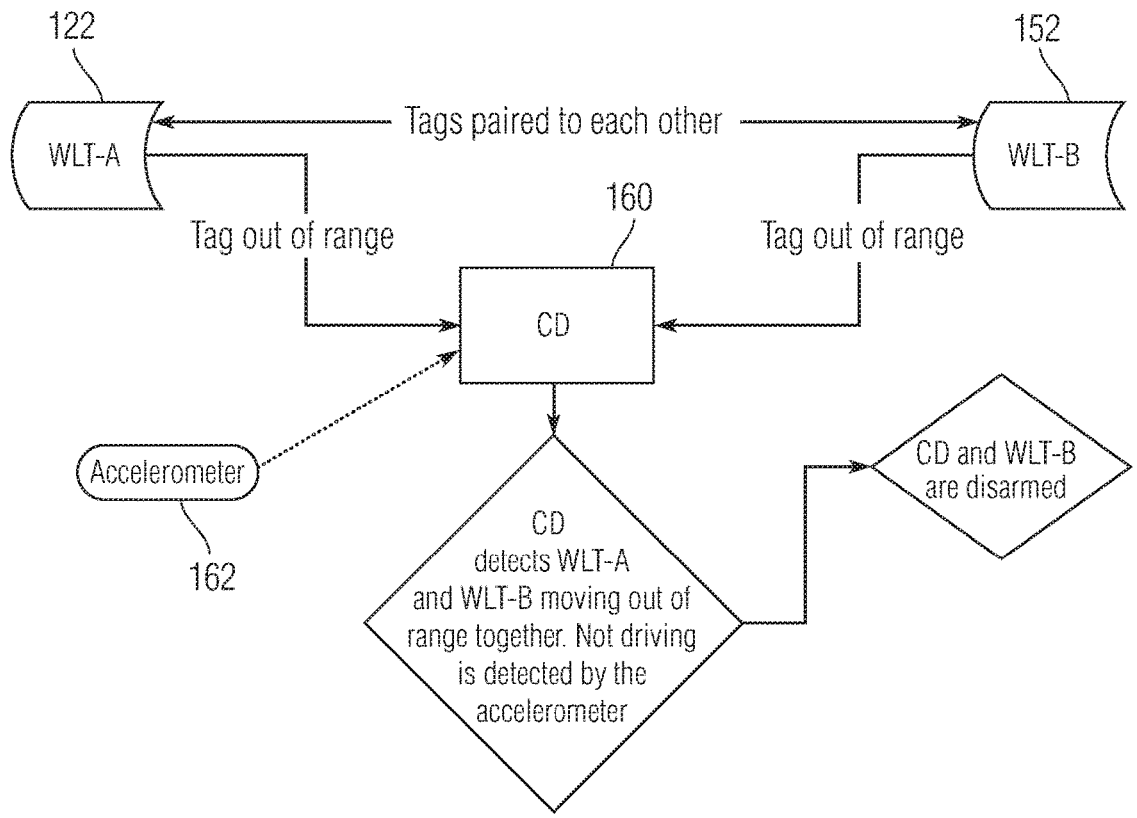
FIG. 24 is a flow diagram illustrating yet another alternative condition in which an alert system having a first wireless tag and a second wireless tag disarms itself.

In an embodiment, as show in FIG. 24, the alert system 100 can disarm itself when the control device 160 detects that the first wireless tag 122 and the second wireless tag 152 have moved out of range or have moved a predetermined threshold distance away from the control device 160. Additionally, the motion sensor 162 confirms that the movement of the first wireless tag 122 and the second wireless tag 152 are in a manner not consistent with driving a vehicle. For example, as shown in FIG. 18B, when the vehicle 300 reaches its destination, the motion sensor 162 in the vehicle 300 determines that the movement is in a manner not consistent with driving a vehicle. The user 700 then turns off the vehicle 300 and leaves the vehicle 300 with the item 150 (e.g., key fob) having the second wireless tag 152 and the child 200 wearing the first wireless tag 122. When the child 200 and the user 700 are at a predetermined threshold distance away from the vehicle 300, the control device 160 acknowledges that it has reached or passed the predetermined threshold distance. Alternatively, when the child 200 and the user 700 reach a distance in which the control device 160 is out of range and cannot receive a signal from the first wireless tag 122 and the second wireless tag 152. Thus, the control device 160 determines that the child 200 and the user 700 have left the vehicle 300 and that the child 200 is not in danger of being left behind in the vehicle 300. Accordingly, the alert system 100 disarms itself.

Figure 25:
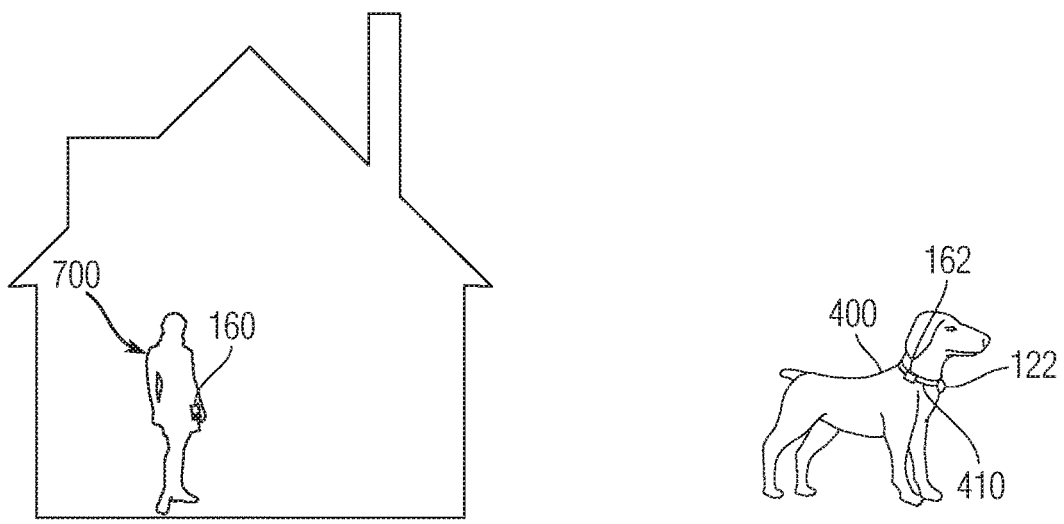
FIG. 25 illustrates an alert system capable of alerting a pet owner when a pet is a predetermined distance away from the pet owner.

In an embodiment, as shown in FIG. 25, the alert system 100 can include a first wireless tag 122, a control device 160, and a motion sensor 162. The motion sensor 162 can be incorporated into the control device 160, can be attached to or be incorporated into the wireless tag 122, or can be a stand-alone motion sensor that is attached to a pet or a child. In one example, as shown in FIG. 25, the motion sensor 162 is attached to a pet collar 410.

In an embodiment, the alert system 100 disarms itself in two different scenarios. First, the alert system 100 can disarm itself when the motion sensor 162 does not detect any motion and the first wireless tag 122 and the control device 160 are out of range or are at a distance longer than the predetermined threshold distance. For example, if a pet 400 is sleeping at home and the pet owner is at work, the alert system 100 can disarm itself. Second, if the first wireless tag 122 is paired with the control device 160 and the motion sensor 162 does not detect a movement. In this example, both the pet 400 and the owner can be in the house sleeping or watching television. As such, the alert system 100 determines that there is no danger of the pet sneaking out of the house without the owner's knowledge.

In an embodiment, the alert system 100 can active or arm itself when the motion sensor 162 detects a motion and the first wireless tag 122 and the control device 160 are paired. In this example, the owner can be at home working or watching television and the pet 400 could be walking around the house and/or playing. Since the pet 400 is moving, the control device determines that the pet 400 could potentially sneak out of the house without the owner's knowledge. Thus, the control device 160 arms or activates the alert system 100.

In an exemplary embodiment, the alert system 100 can send a notification to the pet owner if while the alert system 100 is armed, the first wireless tag 122 and the control device 160 lose contact or if the pet 400 moves a distance greater than a predetermined threshold distance. For example, if the pet owner is watching television and the pet 400 moves to the yard, such that the first wireless tag 122 connected to the dog collar 410 and the control device 160 lose contact, then, the control device 160 concludes that the dog might be sneaking away. Thus, the alert system 100 and will notify the owner via a sound, vibration, and/or change of screen color. Alternatively, the owner is watching television and the pet 400 moves to the yard which is a distance larger than a predetermined threshold distance, then the control device 160 concludes that the dog might be sneaking away and will notify the owner via a sound, vibration, and/or change of screen color.

Figure 26:
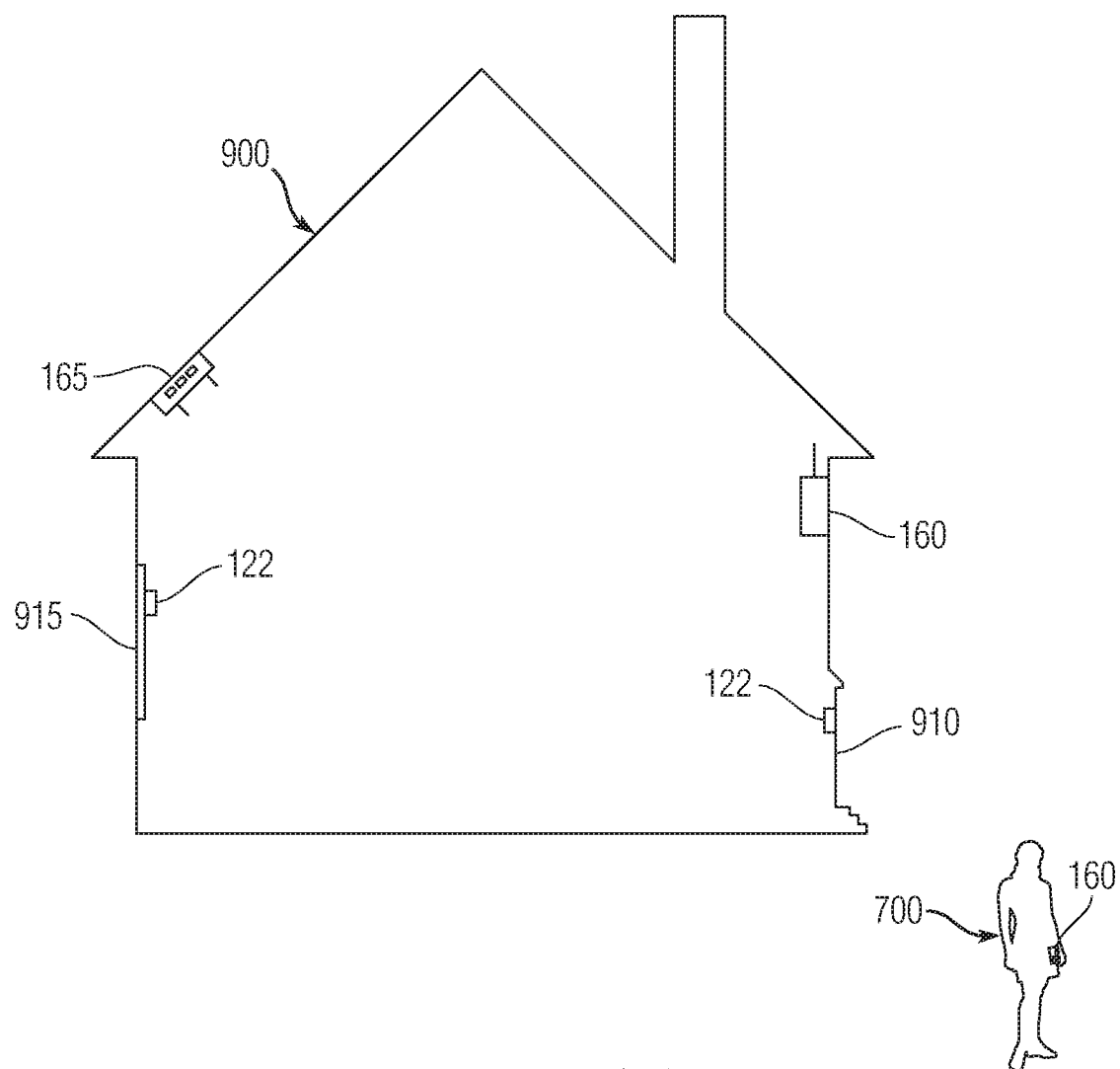
FIG. 26 illustrates an alert system capable of acting as a home security system.

FIG. 26 illustrates an alert system that acts as a home security system. The alert system is capable of detecting when a point of entry, such as a window 915 or a door 910, has been opened. The alert system can include a wireless transmitter 122 that includes a motion detector or vibration detector and is capable of sending a wireless transmission to a wireless transmission and receiving signal device 160. The wireless transmission and receiving signal device 160 is capable of receiving one or a plurality of different wireless transmission signals generated by one or a plurality of wireless transmitters 122 connected to a door, window, or any other part of a house, office, or building. In an exemplary embodiment, shown in FIG. 26, the wireless transmitter 122 can be secured to any portion of the door 910 or a window 915. The door 910, the window 915, or the wireless transmitter 122 can also include a power source, such as a battery. In an alternative embodiment, the motion detector is in a separate unit but in communication with the wireless transmitter 122.

The wireless transmission and receiving signal device 160 can be located at any area so long as it can communicate with the wireless transmitter 122. For Example, as shown in FIG. 26, it can be attached to the wall in the house, the door 910, or the window 915. In one embodiment, the wireless transmitter 122 and wireless transmission and receiving signal device 160 are a single unit. The wireless transmission and receiving signal device 160 can be connected to the internet via router and/or WiFi network 165 that can send information to a user 700 phone application. In an alternative embodiment, the wireless transmitter 122 can be connected to the internet via router and/or WiFi network 165. In this alternative embodiment the wireless transmission and receiving signal device 160 can be eliminated. In another embodiment, the wireless transmitter 160 can transmit cellular signals. Additionally, in all of its embodiments, the wireless transmitter 160 can communicate with a central monitoring station that can be capable of alerting police or other authorities. The wireless transmitter 160 can also communicate with a horn, bell, or other sound producing system within or outside of the building, which can alert when sensor 122 detects movement. The wireless transmitter 160 is also capable of communicating with a separate control device that can arm and disarm the various components of the alert system.

In one example, when one or more of the doors 910 or windows 915 have been opened, the motion detector, such as an accelerometer can detect the movement. As a result, it wakes-up the wireless transmitter 122 to send a signal to the wireless transmission signal receiving device 160 stating that a movement of one of the doors 910 or windows 915 has been detected. The wireless transmitter 122 can then continuously send a signal to the wireless transmission signal receiving device 160 to confirm that the door 910 or the window 915 has not moved passed a predetermined distance from the wireless transmission signal receiving device 160. If the door 910 or the window 915 is moved beyond a predetermined distance, the wireless transmission signal receiving device 160 can send a message via internet to the user's application stating that fact.

In one example, each wireless transmitter 122 on each of the doors 910 or windows 915 has its own unique code so that the user can determine which of the doors 910 or windows 915 has been opened. In one example, each code can be renamed to the name of the room window or door. For example code 0001 can be renamed as kitchen door, and code 0002 can be renamed as main entrance door.

Figure 27:
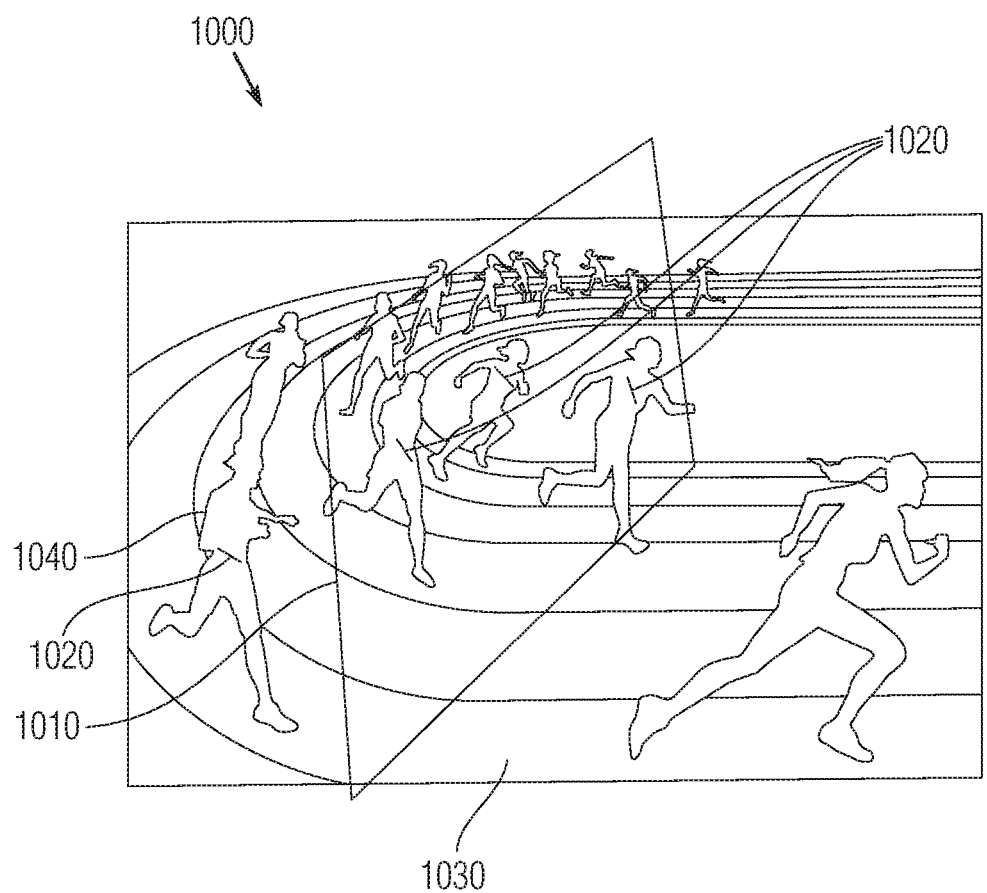
FIG. 27 illustrates an alert system capable of acting as a lap counter.

In another exemplary embodiment, as shown in FIG. 27, the counter system 1000 includes a control device 1010 and wireless tags 1020. As shown in FIG. 27, the control device 1010 is stationary. For example, it can be positioned on a part of track, such as a running track 1030. The control device 1010 can be configured to communicate with a plurality of wireless tags 120 each communicating in a different signal so that control device 1010 can distinguish each of the wireless tags 1020. Each of the plurality of wireless tags 1020 can be configured on a user, such as runners 1040, or an object, such as a racing car. Referring to FIG. 27, as each runner crosses the control device 1010, the distance between the runner's wireless tag 1020 and the control device 1010 will be such that the control device 1010 can receive a signal from the wireless tag 1020. The control device 1010 can interpret the receipt of the signal as the runner completing a lab or reaching a predetermined location, such as $1^{st}$ mile, $5^{th}$ mile, etc.

In each of the exemplary embodiments discussed above, the motion sensor 162 can be part of the control device 160 or part of a device that is paired with the control device 160. For example, the motion sensor 162 can be part of the item that incorporates the first wireless tag 122 or can be part of the item that incorporates the second wireless tag 152.

It is to be understood that both the foregoing general description and the following detailed description are exemplary and explanatory only, and are intended to provide an explanation of various embodiments of the present teachings.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a cargo belt and its many aspects, features and elements. Such a device can be dynamic in its use an operation, this disclosure is intended to encompass the equivalents, means, systems and methods of the use of the device and/or article of manufacture and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

I claim:

1. An alert system comprising:
a first wireless tag; and
a control device capable of being in communication with the first wireless tag,
wherein when the first wireless tag is paired with the control device and the first wireless tag and the control device are at no more than a predetermined distance away from one another and when a sensor does not detect a presence of a child, then the control device unarms itself,
wherein when the first wireless tag is paired with the control device and the first wireless tag and the control device are at no more than a predetermined distance away from one another and when the sensor detects a presence of a child, then the control device arms itself.

2. The alert system of claim 1, wherein the sensor is incorporated in at least one of a device incorporating the first wireless tag and the first wireless tag.

3. The alert system of claim 1, wherein a notification is communicated to a user at a predetermined time after the first wireless tag and the control device (i) separate a pre-determined distance, (ii) change proximity by a pre-determined distance, (iii) lose communication with one another, and a combination thereof.

4. The alert system of claim 1, wherein the sensor comprises a pressure sensor.

5. The alert system of claim 1, wherein the sensor comprises a temperature sensor.

6. The alert system of claim 5, wherein once armed, if the temperature sensor detects a temperature at least one of above a predetermined temperature and below a predetermined temperature, then the armed control device communicates a notification to a user.

7. The alert system of claim 1, wherein once armed, when the first wireless tag and the control device at least one of (i) lose communication contact, (ii) separate a pre-determined distance, or (iii) change proximity by a pre-determined distance, then the armed control device communicates a notification to a user.

8. An alert system comprising:
a wireless tag capable of generating a signal;
a wireless transmission and receiving signal device that receives the signal generated by the wireless tag and sending the received signal to a user device; and
a motion sensor that communicates with the wireless tag,
wherein the user device generates an alert signal based on the received signal,
wherein the user device is different from the wireless transmission and receiving signal device, and
wherein the motion sensor and the wireless tag form a single unit.

9. The alert system of claim 8, wherein the wireless transmission and receiving signal device comprises a WiFi, and wherein the user device comprises a program configured to interpret the received signal and base on its interpretation generate an alert.

10. The alert system of claim 8, wherein the motion sensor is configured to be connected to a portion of an item that can cause harm.

11. The alert system of claim 10, wherein the item is at least one of weapon, medicine container containing medicines, pesticides, kitchen knife drawer, and cookie jars.

12. The alert system of claim 8, wherein when the motion sensor senses a first movement, its status changes from sleep mode to alert mode.

13. The alert system of claim 12, wherein once in the alert mode, when the motion sensor senses one of a second motion and continuity of the first motion, then it requests the wireless tag to send an alert signal to inform a user that an item is being touched.

14. An alert system comprising:
a first wireless tag;
a sensor configured to detect a motion and in communication with the first wireless tag; and
a control device capable of being in communication with the first wireless tag,
wherein when the first wireless tag is paired with the control device and the first wireless tag and the control device are less than at a predetermined distance away from one another, then the control device arms itself, and
wherein once armed, when the first wireless tag and the control device at least one of (i) lose communication contact, (ii) separate a pre-determined distance, and (iii) change proximity by a pre-determined distance, then the armed control device communicates a notification to a user.

15. The alert system of claim 14, wherein the sensor is at least one of an accelerometer and gyroscope.

16. The alert system of claim 14, wherein the notification to the user is in a form of at least one of a vibration, sound, an image, and a text signal.

17. The alert system of claim 14, wherein the first wireless tag and the sensor are incorporated in a single device.

18. The alert system of claim 14, wherein the control device and the first wireless tag communicated with each other via at least one of Bluetooth, radio frequency, RFID, infrared, WiFi, ZigBee, Z wave, and 6LoWPAN.

* * * * *